United States Patent [19]

Inoue et al.

[11] Patent Number: 5,378,428
[45] Date of Patent: Jan. 3, 1995

[54] METHOD OF PRESERVING ARTICLE WITH AN OXYGEN ABSORBENT COMPOSITION

[75] Inventors: Yoshiaki Inoue; Shigeru Murabayashi; Kazuo Fujinami; Isamu Yoshino, all of Tokyo; Takamasa Kawakami; Satoru Makinose, both of Tsukuba; Akira Naito, Tokyo, all of Japan

[73] Assignee: Mitsubishi Gas Chemical Company, Inc., Tokyo, Japan

[21] Appl. No.: 154,447

[22] Filed: Nov. 19, 1993

Related U.S. Application Data

[62] Division of Ser. No. 690,486, Apr. 24, 1991, Pat. No. 5,286,407.

[30] Foreign Application Priority Data

| Apr. 25, 1990 | [JP] | Japan | 2-107358 |
| May 25, 1990 | [JP] | Japan | 2-134111 |
| Jul. 30, 1990 | [JP] | Japan | 2-199209 |
| Aug. 14, 1990 | [JP] | Japan | 2-213677 |
| Aug. 14, 1990 | [JP] | Japan | 2-213678 |
| Jan. 10, 1991 | [JP] | Japan | 3-012368 |
| Feb. 22, 1991 | [JP] | Japan | 3-048611 |
| Mar. 27, 1991 | [JP] | Japan | 3-085933 |

[51] Int. Cl.⁶ .............. C23F 11/02; C09K 15/02; C09K 15/04
[52] U.S. Cl. .................. 422/9; 422/40; 252/188.28; 252/400.1; 252/389.1; 252/384; 206/204
[58] Field of Search ............ 252/188.28, 400.1, 384, 252/389.1; 206/204; 422/9, 40

[56] References Cited

U.S. PATENT DOCUMENTS

| 3,935,141 | 1/1976 | Potts et al. | 524/47 |
| 4,192,773 | 3/1980 | Yoshikawa et al. | 252/440 |
| 4,199,472 | 4/1980 | Ohtsuka et al. | 252/427 |
| 4,366,179 | 12/1982 | Nawata et al. | 426/395 |
| 4,579,223 | 4/1986 | Otsuka et al. | 206/204 |
| 4,769,175 | 9/1988 | Inoue | 206/204 |
| 4,856,649 | 8/1989 | Inoue | 206/204 |
| 4,856,650 | 8/1989 | Inoue | 206/204 |
| 4,908,151 | 3/1990 | Inoue et al. | 252/188.28 |
| 4,983,651 | 1/1991 | Griffin | 524/47 |
| 5,021,515 | 6/1991 | Cochran et al. | 525/371 |
| 5,049,624 | 9/1991 | Adams et al. | 525/371 |
| 5,085,878 | 2/1992 | Hatakoyama et al. | 426/107 |

FOREIGN PATENT DOCUMENTS

2187466A 9/1987 United Kingdom.

Primary Examiner—Robert L. Stoll
Assistant Examiner—Joseph D. Anthony
Attorney, Agent, or Firm—Armstrong, Westerman, Hattori, McLeland & Naughton

[57] ABSTRACT

A method of preserving an article which includes enclosing the article and an oxygen absorbent parcel in a container having gas-barrier properties and sealing the container. The parcel is formed by packing an oxygen absorbent composition with a gas permeable packing material, the oxygen absorbent composition containing an linear hydrocarbon polymer having one or more unsaturated groups or a mixture of the polymer with an unsaturated fatty acid compound, an oxidation promoter, a basic substance and an adsorption substance.

28 Claims, 5 Drawing Sheets

SINGLE - PACKED PARCEL

GAS-PERMEABLE PACKING MATERIAL
(2)-A

GAS-PERMEABLE PACKING MATERIAL
(2)-B

ADHESIVE SHEET-ATTACHED,
GAS-PERMEABLE PACKING
MATERIAL (2)-B

SINGLE-PACKED PARCEL

DOUBLE-PACKED PARCEL

METHOD OF PRESERVING ARTICLE WITH AN OXYGEN ABSORBEN COMPOSITION

This is a division, of application Ser. No. 07/690,486 filed Apr. 24, 1991 now U.S. Pat. No. 5,286,407.

BACKGROUND OF THE INVENTION

This invention relates to an oxygen absorbent composition which can absorb water, oxygen, acidic substances, etc., and optionally, which can also adjust humidity. This invention relates to an oxygen absorbent parcel formed by enclosing the above oxygen absorbent composition in a gas-permeable packing material which is impermeable to fine dust or capable of protecting an article preserved from fine dust.

Further, this invention provides a method for use of the above oxygen absorbent parcel to suitably preserve metals, metal products, electronic products, electronic parts and components, dried foods, medicaments, photographs, ancient documents, pictures, pressed flowers, etc.

Japanese Patent Publication No. 040880/1987 proposes a method using oxygen absorbents containing catechol, ascorbic acid and a metal powder as essential ingredients. However, this method has a defect in that since these oxygen absorbents require a water content to absorb oxygen, a metal, when preserved, causes rust on its surface or an article preserved absorbs humidity due to transpiration of co-present water. In order to prevent this transpiration of a water content, Japanese Patent Publication Kokai No. 15378/1981 proposes a method using an oxygen absorbent and a desiccant in combination. In this method, however, a water content is transferred from the oxygen absorbent to the desiccant, and the oxygen absorption is terminated before required or the drying function is deteriorated.

As a method to overcome the above defects of the oxygen absorbent, Japanese Patent Publications Kokai Nos. 155641/1981, 198962/1988, 67252/1989 and 285973/1986 propose oxygen absorbents which require no water content to absorb oxygen, i.e. oxygen absorbents containing an unsaturated fatty acid compound as a main ingredient. Since, however, the oxygen absorption rate and capability of these oxygen absorbents are low, it is required to increase the amount of an oxygen absorbent composition in order to achieve sufficient oxygen absorption, and when an article is preserved in a container for a long period of time, the oxygen concentration in the container sometimes gradually increases due to the article preserved and oxygen and water which have penetrated the container to some extent. Therefore, the expected effect on preservation has limits.

It is the first object of this invention to increase the oxygen absorption rate and oxygen absorption capability (maximum oxygen absorption) of the above oxygen absorbent composition and provide fields of article preservation technologies with an oxygen absorbent composition which can secure preservation of an article as long as possible in as small an amount as possible.

In preservation of paintings, calligraphic works, antiques and photographs, it is conventional practice to enclose these articles and a desiccant together in a container and seal the container, since humidity is considered to have a bad influence. When these articles are preserved for a long period of time, however, a satisfactory effect is not always obtained, and undesirable phenomena such as color fading and "cracking" are found.

In order to overcome the above defects, Japanese Patent Publication Kokai No. 198962/1988 discloses a method for adjusting the oxygen concentration inside a sealed system to not more than 0.1% by means of a small gas-permeable parcel containing an oxygen absorbent which requires no water content for oxygen absorption and a desiccant.

The above method is preferably usable to preserve metal products and semiconductor devices since the humidity inside the sealed system can be decreased considerably. However, it is difficult to apply this method to the preservation of articles which undergo a chemical change or biological deterioration due to the presence of oxygen and which undergo physical fracture due to an influence of water (e.g. cracking and peeling when the articles are dried excessively or swelling and fusion when too much an amount of water is present).

Examples of such articles are ancient documents, ancient books, photographs, specimens, medicaments, magnetic tapes, etc. No good methods have been available, or it has been difficult, to preserve these articles well.

It is the second object of this invention to provide an oxygen absorbent composition which can easily maintain any degree of humidity optimum for preserving an article and which absorbs oxygen or an acidic substance inside a system.

For rust prevention of metals, metal products, electronic products, electronic parts and components, etc., during the preservation thereof, it has been attempted to enclose a composition having rust-preventing activity such as silica gel, volatile rust preventive, or the like in a gas-permeable packing material, enclose the resultant parcel and an article together in a container and seal the container.

However, fine powders adhere to a surface of this rust preventive parcel when the parcel is produced or when the composition is enclosed in a packing material, and the fine powders contaminate an article preserved or cause a short electrical circuit.

When a rust preventive is exposed to atmosphere for a long period of time before enclosing it in a container together with an article and sealing the container, various defects arise. For example, the performance of the rust preventive is degraded, or it is impossible to sufficiently prevent water or an acidic substance from forming rust.

It is the third object of this invention to develop a rust preventive parcel which has a surface devoid of fine powders, which exhibits performance undegradable even if exposed to atmosphere before use, and which sufficiently prevents water and an acidic substance from forming rust, and to use such a rust preventive parcel to preserve electronic parts, electronic products, semiconductor parts and semiconductors.

When a parcel packed with a rust-preventive composition is used to preserve electronic parts and products, parts for semiconductor devices in particular, and materials for manufacturing semiconductor devices, a packing material formed of a laminate of paper and a porous plastic film is used as a gas-permeable packing material. However, when this packing material is used to pack a rust-preventive composition, dust floating in air adheres to a surface of the packing material under the attraction of static electricity of the packing material. It is undesirable to use such a rust preventive parcel as it is in order to preserve electronic parts and products, parts for semiconductor devices in particular, and materials for manufacturing semiconductor devices, since these articles preserved are contaminated, an electrical short circuit is formed, or rust is formed in circuits.

Meanwhile, Japanese Patent Publication Kokai No. 55075/1988 proposes a double-packed oxygen absorbent parcel formed by packing an oxygen absorbent parcel with a gas-permeable bag of a plastic film having pores measuring 0.2 to 2 mm in diameter. Since, however, diameters of the pores are large, dust of the oxygen absorbent composition passes through the pores, and the contamination with the dust cannot be prevented.

It is the fourth object of this invention to provide a parcel of which the packing material has a surface free from adherence of dust and prevents dust of a composition from passing through.

A photograph is widely and generally used to convey an image as information. However, substances constituting a photograph change with time, and it has been difficult to preserve a fixed image in an as-fixed state for a long period of time.

When a photograph is preserved under atmosphere having a high humidity, mold occurs in a gelatin layer used as a material, a base film contracts due to oxidation of a dyestuff or a change in humidity, or a dyestuff alters in properties due to a reducing substance present in air.

There is a method for preserving a photograph not by stabilizing photograph-constituting materials but by controlling an environment.

Japanese Patent Publication Kokai Nos. 88256/1986 and 167836/1989 disclose a method for preserving photosensitive materials with an antioxidant (specifically, an inert gas and/or an oxygen absorbent) and/or a desiccant. This method may be taken into consideration as it is in order to preserve a photograph for a long period of time. However, the defects of this method are as follows:

(1) When an inert gas is used as an antioxidant, it is impossible to reduce an oxygen concentration inside the system preserving a photograph to a degree in which photograph-constituting substances do not undergo oxidation. Further, this method cannot be utilized easily since an apparatus for substituting an inert gas is required.

(2) A sealing method keeping an oxygen absorbent inside the system has an effect that an oxygen concentration can be decreased until photograph-constituting substances are not oxidized. However, water contained in an oxygen absorbent is sometimes transferred to a film inside the system to cause physical destruction such as fusion between the film and a packing material. Further, in an iron-containing oxygen absorbent generally used, the absorbent absorbs oxygen and hydrogen is generated although its amount is small. Due to this dyestuff are altered in properties and preservation of a photograph is affected.

(3) In a sealing method keeping a desiccant inside the system, an alteration of a photograph is slowed since the humidity inside the system is decreased. However, a desiccant is not capable of inhibiting oxidation of photograph-constituting substances. Therefore, this method only has an effect of inhibiting occurrence of mold from the viewpoint of long term preservation, and cannot be applied in order to secure an image. Further, when the humidity inside the system is decreased excessively with a strong desiccant, physical destruction of photograph-constituting substances such as a crack and peel may arise. It is therefore required to determine a suitable amount of the desiccant, and such determination is difficult.

(4) In a method using an oxygen absorbent and desiccant in combination, water is essential for an oxygen absorption reaction, and the water is transferred to the desiccant to terminate the oxygen absorption reaction during a short period of time. In some cases, oxygen remains in the system. It is therefore very risky to employ such a method for long-term preservation.

It is the fifth object of this invention to preserve a photograph as it is for a long period of time by a simple method in which the photograph is enclosed in a container together with an oxygen absorbent and a desiccant.

A bearing for a rotor (to be simply referred to as "bearing" hereinafter) is mainly manufactured from a bearing steel, and packed and stored after rust-preventive oil is applied on it. Thereafter, a manufacturer of precision machines and electronic machines and components carries out steps of removal of the rust-preventive oil, application of machine oil, assembly, etc.

When a manufacturer manufactures a bearing as a part and delivers it to another manufacturer, the bearing is coated with rust-preventive oil or immersed in rust-preventive oil in order to prevent rust formation during the delivery from one manufacture to another and storage at a warehouse. Since, however, the rust-preventive oil is unnecessary or a hindrance at the assembly time, a washing step for removal thereof is required.

It is troublesome to carry out steps of applying a coating which is unnecessary or a hindrance for a future operation and removing the coating at a later time. It is naturally desirable to do away with such steps.

Further, the above washing step uses an organo-halogen-containing solvent such as Freon, trihaloethane, trihalomethane, or the like, and these solvents destroy an environment. It is therefore desired to reduce the use amount thereof.

A bearing which is required to have a precisely rolling properties is affected due to inclusion of a foreign matter (dust) in a rust-preventive oil. In particular, in the case of a bearing for a precision machine and electronic machine and components, a large amount of an ultrapure solvent is required to wash such foreign matter off and remove it.

As explained above, when a preservation method using a rust-preventive oil is employed, it is necessary to remove the rust-preventive oil and dust contained in the rust-preventive oil. When oil and dust have a bad influence on not only a bearing but also other parts in a precision machine and a electronic machine and component in particular, it is indispensable to remove the oil and dust before use, and for this reason, a complicated working and the use of a large amount of a solvent are required. As a result, a product price increases and the solvent causes environmental contamination.

It is the sixth object of this invention to provide a method for preserving a bearing, which can be put to practical use even without using any rust-preventive oil.

A copper powder, silver powder, iron powder, rare earth metals, lead, tin and a powder of these (to be simply referred to as "a metal powder" hereinafter) are mainly used as a material for a sintered part of a machine and electronic machine and component, magnetic substance, solder, electrically conductive paste, etc. A carbon powder is sintered and used as a magnetic substance, heat-resistant part, etc. These powders are easily oxidized when exposed in air, which oxidation causes undesirable results such as a decrease in strength of a sintered part, a decrease in magnetic density, a decrease in solder adhesion and insulating properties, etc. Therefore, the oxidation of these powders is conventionally prevented by a method of substituting an inert gas such as nitrogen, argon, or the like for oxygen in a container (to be referred to as "gas substitution method" hereinafter), a method of enclosing them in a container together with a desiccant and sealing the container, a method of immersing them in an animal or plant oil, silicone oil, or the like, or some other methods.

However, in the gas substitution method, it is difficult to completely substitute an inert gas for oxygen and water among power particles, and the preservability is deteriorated due to oxygen and water which have permeated a packing material. A highly active powder undergoes oxidation even in the absence of water.

In a method of immersing them in an animal or plant oil or silicone oil, no desired strength is obtained when a powder is shaped under pressure and sintered. Hence, it is necessary to wash the animal or plant oil off with a solvent. The use of a large amount of the solvent deteriorates a working environment and affects natural environment. Organohalogen-containing solvents such as a Freon compound, e.g. trichlorofluoromethane, trihaloethane, trihalomethane, etc., used for the above washing cause environmental destruction, and it is therefore desired to decrease them.

Such a conventional method for preserving powders being oxidized has a limitation in preservation, and there are some highly active powders which cannot be preserved by this method. A manufacture for these powders being oxidized having a problem in preservation is required to manufacture such powders only after receipt of an order due to difficulty in preservation, and the manufacturer is required to have excess facilities and labor force. A user is also required to be punctual for a delivery term and strictly observe the time for use. These make steps, other documentation, etc., complicated uselessly and cause a useless increase in a cost.

It is the seventh object of this invention to develop a technique which can overcome the above defects of conventional methods and permit preservation of powders being oxidized simply and securely.

When a shadow mask formed of iron, a lead frame formed by plating a part or entire surface of an iron or iron-nickel alloy sheet with silver or gold, and the like are exposed to air, rust is formed on the surface thereof, and disadvantageously, problems such as contamination with dust, a decrease in solder-adhesion to a printing board, etc., arise. In particular, dew is formed due to a drastic change in temperature and humidity during the transportation abroad by air, and formation of rust is promoted. The following methods have been proposed to prevent the rust formation.

(1) Method by Gas Substitution

Japanese Patent Publication Kokai No. 139370/1989 proposes a method in which nitrogen gas is substituted for air in a container. This method, however, has the following defects. A special apparatus is required for gas substitution, it is difficult to carry out efficient gas substitution in a container, it is difficult to achieve the object of this method even if a large amount of nitrogen gas is used, and the like.

(2) Method Using Nitrogen Gas Substitution and Desiccant in Combination

Japanese Patent Publication Kokai No. 139380/1989 proposes a method using nitrogen gas substitution and a desiccant in combination. However, this method also has the same defects as those in above (1).

And, the humidity inside the system increases due to water which has penetrated through a packing material, and the presence of the desiccant alone is not sufficient to prevent water on a metal surface from forming dew due to a drastic change in temperature and humidity during the transportation.

It is the eighth object of this invention to make it possible to transport metals and products including metals abroad without causing rust and with keeping them intact.

SUMMARY OF THE INVENTION

This invention discloses an oxygen absorbent composition which contains, as essential components, a linear hydrocarbon polymer having one or more unsaturated groups or a mixture of a linear hydrocarbon polymer having one or more unsaturated group and an unsaturated fatty acid compound and an oxidation promoter and which optionally contains a basic substance and/or an absorption substance; an oxygen absorbent parcel formed by packing the oxygen absorbent composition with a gas-permeable material; and a method for preserving an article by using the oxygen absorbent parcel.

This invention also discloses an oxygen absorbent composition imparted with a humidity adjusting function by further incorporating a humidity adjusting agent having a viscosity, at 20° to 50° C., of not more than $10^4$ cp and an equilibrium relative humidity of not more than 70% into the above oxygen absorbent composition of this invention; and an oxygen absorbent parcel formed by packing this oxygen absorbent composition with a gas-permeable packing material.

Further, this invention discloses a parcel formed by attaching an adhesive layer of an adhesive sheet comprising an adhesive and a sheet on a surface of the above oxygen absorbent parcel of this invention; and an oxygen absorbent double-packed parcel formed by packing the oxygen absorbent parcel of this invention with a gas-permeable packing material impermeable to fine dust, i.e. a gas-permeable packing material having a water vapor permeability of not less than 1 g/$m^2$·day, an oxygen permeation rate of not less than 1,000 ml/$m^2$·atm·day and a capturing efficiency of not less than 50% for dust having a size of not less than 0.3 μm.

This invention discloses a method of simply and securely preserving a photograph, a bearing, a powder being oxidized, metal or a product including a metal by means of an oxygen absorbent parcel of this invention.

This invention discloses an oxygen absorbent composition which comprises an oxygen absorbent composition containing an unsaturated fatty acid compound as an essential component and, optionally, one or not less than two of an oxidation promoter, a basic substance and an adsorption substance and a humidity adjusting agent having a viscosity, at 20° to 50° C., of not more than $10^4$ cp and an equilibrium relative humidity of not more than 70%, and which exhibits an equilibrium relative humidity, as an entire system containing the composition, of 20 to 70%.

This invention discloses a parcel formed by attaching an adhesive layer of an adhesive sheet comprising an adhesive and a sheet to a surface of an oxygen absorbent parcel formed by packing an oxygen absorbent composition containing an unsaturated fatty acid compound as an essential component and, optionally, one or not less than two of an oxidation promoter, a basic substance and an adsorption substance with a gas-permeable packing material; and an oxygen absorbent double-packed parcel formed by packing said oxygen absorbent parcel of this invention with a gas-permeable packing material impermeable to fine dust, i.e. a gas-permeable packing material having a water vapor permeability of not less than 1 $g/m^2 \cdot day$, an oxygen permeation rate of not less than 1,000 $ml/m^2 \cdot atm \cdot day$ and a capturing efficiency of not less than 50% for dust having a size of not less than 3 $\mu m$.

This invention discloses a method of simply and securely preserving a photograph, a bearing, a powder being oxidized, a metal or a product containing a metal by means of an oxygen absorbent parcel formed by packing an oxygen absorbent composition containing an unsaturated fatty acid compound as an essential component and, optionally, one or not less than two of an oxidation promoter, a basic substance and an adsorption substance with a gas-permeable packing material.

The oxygen absorbent composition of this invention does not necessitate water for an oxygen absorption reaction, has a high oxygen absorption rate and exhibits a remarkably high oxygen absorption capability as compared with conventional oxygen absorbents. Therefore, the oxygen absorbent composition of this invention is suitably usable for the preservation of articles which are badly affected by the presence of water or require an optimum range of humidity for the preservation thereof, such as metals, metal products, electronic products, electronic parts, dry food, medicaments, photographs, ancient documents, paintings, pressed flowers, etc., and produces a secure effect on the preservation thereof for a long period of time.

The oxygen absorbent composition containing the oxygen absorbent composition of this invention and the humidity adjusting agent of this invention produces a high effect, particularly, on the preservation of medicaments, photographs, ancient documents, paintings, etc.

The parcel formed by attaching an adhesive sheet on a surface of the oxygen absorbent parcel of this invention, and the oxygen absorbent double-packed parcel formed by further packing the oxygen absorbent parcel of this invention with a gas-permeable packing material impermeable to fine dust are most preferred for the prevention of rust on electronic products and parts including a semiconductor, etc., in particular.

DETAILED DESCRIPTION OF THE INVENTION

Figure 1:
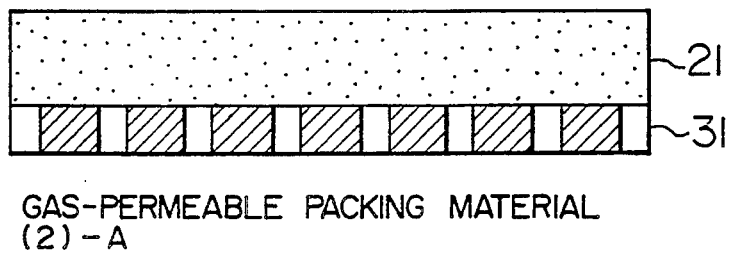
FIG. 1 and FIG. 2 each show one embodiment of a gas-permeable packing material (2) used in this invention.

This invention basically relates to an oxygen absorbent composition which contains, as essential components, a linear hydrocarbon polymer having one or more unsaturated group or a mixture of a linear hydrocarbon polymer having one or more unsaturated groups with an unsaturated fatty acid compound (to be sometimes referred to as "main component" hereinafter) and an oxidation promoter and which optionally contains a basic substance and/or an adsorption substance; and this invention also relates to a composition comprising this oxygen absorbent composition and a substance having a humidity adjusting function; and an oxygen absorbent parcel formed by packing any of these compositions with a gas permeable packing material or a gas-permeable packing material impermeable to fine dust or capable of protecting an article from fine dust.

This invention also discloses a method of preserving articles which comprises enclosing an oxygen absorbent parcel of this invention in a container together with an article such as a metal, a product containing a metal, an electronic product, an electronic part, a photograph, a bearing, a powder being oxidized or the like, and sealing the container.

Further, this invention discloses a combination of an oxygen absorbent composition being different from the above oxygen absorbent composition in components and having an unsaturated fatty acid compound with a humidity adjusting agent; a parcel formed of the oxygen absorbent composition having an unsaturated fatty acid compound as an essential component and a novel packing material; and a method of preserving an article which comprises enclosing this novel oxygen absorbent parcel in a container together with several kinds of articles and sealing the container.

That is, this invention basically relates to a known oxygen absorbent composition containing an unsaturated fatty acid compound as an essential component and optionally, one or not less than two of an oxidation promoter, a basic substance and an adsorption substance; and this invention also relates to a novel composition comprising this oxygen absorbent composition and a substance having a humidity adjusting function; and an oxygen absorbent parcel formed by packing any one of these compositions with a gas-permeable packing material or a novel gas-permeable packing material impermeable to fine dust or capable of protecting an article from fine dust.

Further, this invention discloses a method of preserving an article such as a metal, a product containing a metal, an electronic product, an electronic part, a photograph, a bearing, a powder being oxidized, etc., which comprises enclosing the above oxygen absorbent parcel in a container together with such an article and sealing the container.

The oxygen absorbent composition of this invention exhibits a preservation effect by absorbing oxygen, water and an acidic substance. This composition contains, as essential components, a main component to absorb oxygen and a substance to promote oxygen absorption and optionally contains at least one of an adsorbent, a basic substance and a carrier. And, a heat inhibitor may be further incorporated as required. The substance to promote oxygen absorption is mainly selected from various catalysts, and also selected from an adsorbent, a basic substance, a carrier, etc. In addition, an adsorbent sometimes works as a carrier as well.

In this invention, the linear hydrocarbon polymer having an unsaturated group or the mixture of a linear hydrocarbon polymer having an unsaturated group with an unsaturated fatty acid compound is a main component. The linear hydrocarbon polymer having one or more unsaturated group means a polymer having at least 10 carbon atoms and at least one carbon-carbon double bond and a derivative thereof. The viscosity and molecular weight thereof are not specially limited. For example, this polymer may optionally contain a hydroxyl group, formyl group, etc., and is specifically selected from a polymer of isoprene, butadiene, 1,3-pentadiene, or the like, squalene, etc.

The unsaturated fatty acid compound used in this invention is a fatty acid compound having at least 10 carbon atoms and a carbon-carbon double bond, and it is selected from an unsaturated fatty acid and a salt or ester thereof. The unsaturated fatty acid compound is not necessarily a pure substance, and the unsaturated fatty acid and the salt or ester thereof may contain a substituent such as a hydroxyl group, formyl group, etc.

Examples of the unsaturated fatty acid and compound thereof are oleic acid, linoleic acid, arachidonic acid, parinaric acid, dimer acid, ricinoleic acid etc.; fats and oils containing triglyceride thereof, esters thereof, transition metal salts thereof, and the like. Transition metal salts of unsaturated fatty acids can be also used as a catalyst.

The oxidation promoter in this invention means a catalyst to accelerate the oxygen absorption rate of the linear hydrocarbon polymer having one or more unsaturated groups or the unsaturated fatty acid compound which is a main component, and the catalyst is specifically selected from transition metals such as cobalt, chromium, copper, nickel, etc., and compounds thereof. The compounds thereof include inorganic salts such as sulfate, chloride, nitrate, etc., organic acid salts such as fatty acid salt, a complex of an amine compound and a radical initiator.

The transition metal compound is preferably that which can be homogeneously mixed with the linear hydrocarbon polymer having one or more unsaturated groups or the unsaturated fatty acid compound, such as a variety of saturated or unsaturated acid salts, complexes, etc.

The basic substance in this invention is a substance which adsorbs an acidic substance generated due to the absorption of oxygen by the linear hydrocarbon polymer having one or more unsaturated groups or the unsaturated fatty acid compound and an acidic substance being present in the system or diffusing from outside the system into the system through a preserving container and absorbs water. The basic substance is specifically selected from oxides, hydroxides, carbonates, organic acid salts and of alkali metals and alkaline earth metals amine compounds. Oxides of alkaline earth metals are preferred, and calcium oxide and magnesium oxide which absorb both an acidic substance and water are particularly preferred.

The adsorption substance in this invention is a substance to adsorb a decomposition substance formed by the absorption of oxygen by the linear hydrocarbon polymer having one or more unsaturated groups or the unsaturated fatty acid compound or water. In addition to this function, the adsorption substance carries the linear hydrocarbon polymer having one or more unsaturated groups or the unsaturated fatty acid compound and increases an oxygen contact area to increase the oxygen absorption rate. Further, the adsorption substance carries each component of the composition to improve fluidity of particles of the composition as a whole and it hence makes it easier to produce and pack the composition. The adsorption substance is specifically selected from silica gel, activated clay, diatomaceous earth, zeolite, activated carbon, pearlite, etc.

The composition of this invention may contain a carrier and a heat inhibitor as required.

The carrier is that which carries a main component to retain a form of the composition on one hand and increases an oxygen contact area to increase the oxygen absorption rate on the other hand. Specifically, the carrier is selected from paper formed of pulp, nonwoven fabric formed of an olefin resin such as polyethylene, etc., particulates such as silica gel, activated clay, zeolite, pearlite, etc. The carrier is used in such a manner that a main component of the oxygen absorbent composition of this invention is immersed in the carrier or mixed with the carrier.

The heat inhibitor is a substance which is added to prevent exothermic heat and spontaneous ignition of a large quantity of parcels when the parcels are exposed to atmosphere. The heat inhibitor is a solid at a temperature between 10° C. and 50° C. and it is liquefied and fluidized at a temperature between higher than 50° C. and 230° C.

The present oxygen absorbent composition is not specially limited as far as it contains, as essential components, a linear hydrocarbon polymer having one or more unsaturated groups or a mixture of a linear hydrocarbon polymer having one or more unsaturated groups and an oxidation promoter. In general, the present oxygen absorbent composition is classified into a composition-1 containing a main component of this invention, an oxidation promoter, a basic substance and adsorption substance, a composition-2 containing a main component of this invention, an oxidation promoter, a basic substance, an adsorption substance and a heat inhibitor, a composition-3 containing a main component of this invention, an oxidation promoter, a basic substance, an adsorption substance and a carrier, a composition-4 containing a main component of this invention, an oxidation promoter and a basic substance, a composition-5 containing a main component of this invention, an oxidation promoter and an adsorption substance, and the like. In particular, the composition-1 which is granular powder is preferred in view of oxygen absorption performance, and the composition-3 which is in a sheet form is preferred since no dust is generated.

Further, the composition-1 and the composition-2 can be pressed into a tablet form.

The process for the preparation of these compositions is not specially limited. In general, these compositions are prepared by a method which comprises adding an oxidation promoter to a main component of this invention, allowing an adsorption substance to carry the mixture, and covering a surface of the resultant composition with a basic substance and/or a heat inhibitor, a granulation method which comprises preparing preliminary mixtures each of which consists some of a main component of this invention, an oxidation promoter, a basic substance, an adsorption substance and a heat inhibitor, and granulating these mixtures while these mixtures are homogeneously blended, and a method which comprises placing a sheet (I) formed by adding an oxidation promoter to a main component of this invention and impregnating the resultant mixture into a carrier and a sheet (II) formed by impregnating a liquid organic substance and/or an amine compound into a carrier one on the other and forming the resultant combined sheets into one sheet.

The weight ratio of the oxygen absorbent composition of this invention is as follows. Per 100 parts by weight of a main component of this invention, the amount of the oxidation promoter is 0.01 to 75 parts by weight, that of the basic substance is 0.1 to 1,000 parts by weight, that of the adsorption substance is 50 to 2,000 parts by weight, that of the carrier is 100 to 5,000 parts by weight, and the that of the heat inhibitor is 0.5 to 100 parts by weight.

The composition of these is packed in a gas-permeable packing material, and used by enclosing the resultant parcel in a container together with an article and sealing the container.

The humidity adjusting agent used in this invention is that which keeps an optimum relative humidity inside the system.

The humidity adjusting agent of this invention is a substance which has a viscosity, at a temperature between 20° C. and 50° C., of not more than $10^4$ cp and an equilibrium relative humidity of not more than 70%, and which adjusts the relative humidity inside the sealed system enclosing the parcel packed with the oxygen absorbent composition and an article to an optimum humidity within 20 to 70%.

In addition, the "equilibrium relative humidity" means a relative humidity attained after a sufficient time during which an equilibrium is obtained in a closed system having a predetermined temperature while the humidity adjusting agent, air, etc., are present.

The humidity adjusting agent used in this invention is an aqueous solution of a water-soluble organic compound. The water-soluble compound is a compound freely mixable with water, and specifically selected from compounds having a hydroxyl group, an amino group or both of these such as trimethylol propane, glycerin, polyethylene glycol, and amines such as triethanolamine, tripropanol amine, etc., and the like, although it shall not be limited to these compounds.

The form of the humidity adjusting agent used in this invention is not specially limited. In view of handling in practical use, a humidity adjusting agent impregnated into a carrier is desirable.

The carrier into which the humidity adjusting agent is to be impregnated is selected from paper, cloth, non-woven fabric, porous adsorbents such as silica gel, activated alumina, zeolite, activated clay, pearlite, etc., and the like.

Further, the humidity adjusting agent may be used in the form of a gas-permeable small bag in which the carrier-supported humidity adjusting agent is enclosed alone, in the form of a gas-permeable small bag in which the carrier-supported humidity adjusting agent is enclosed together with the oxygen absorbent composition or in some other form.

The amount of the carrier-supported humidity adjusting agent is to be suitably selected depending upon an article to be preserved. In general, the amount of the carrier-supported humidity adjusting agent per 100 parts by weight of the oxygen absorbent composition is 0.1 to 10 parts by weight.

The form of a combination of the oxygen absorbent composition with the carrier-supported humidity adjusting agent may be freely selected. In view of ease in handling, however, a solid or sheet form is preferred, and in view of an actual use, a gas-permeable small bag in which the combination is enclosed in preferred.

The process for preparing or packing the oxygen absorbent composition of this invention is not specially limited. The preparation or packing process is carried out by a method in which an oxidation promoter is added to a main component of this invention, then, an adsorption substance is allowed to support the resultant mixture, a primary powder is prepared by covering a surface of the supported mixture with a basic substance and/or a heat inhibitor, another primary powder is separately prepared by allowing a carrier to support a humidity adjusting agent, these primary powders are respectively weighed and mixed, and the mixture is packed in a gas-permeable packing material; a method in which the above primary powders are separately packed in gas-permeable packing materials, or a method in which an oxidation promoter and a humidity adjusting agent are added to a main component of this invention, an adsorption substance is allowed to support the resultant mixture, a basic substance and/or a heat inhibitor are/is allowed to cover a surface of the supported mixture to form a primary powder, and the primary powder is weighed and then packed in a gas-permeable packing material at a packing time, or a method in which an oxidation promoter and a humidity adjusting agent are added to a main component of this invention, then, an adsorption substance is allowed to support the resultant mixture to form a sheet, and the sheet is packed in a gas-permeable packing material.

The oxygen absorbent composition of this invention is generally packed in a gas-permeable packing material. However, when it is used as a rust preventive for the preservation of electronic products and electronic parts, semiconductors in particular, it is required to avoid bringing various-size dust attached to a surface of a parcel packed with an oxygen absorbent composition into a preservation system. For this purpose, this invention proposes a method in which a surface of a parcel packed with an oxygen absorbent composition be covered with an adhesive layer comprising an adhesive and a sheet by attaching the adhesive layer to the surface before it is used for the preservation of a semiconductor, etc.

That is, the adhesive layer is attached to the surface of the oxygen absorbent parcel and peeled before use, whereby no fine dust is brought into a packing container enclosing an article. This method produces a secondary effect that the oxygen absorption performance is not degraded even if the oxygen absorbent parcel is exposed to atmosphere before use, and the oxygen absorbent parcel exhibits its full performance when used.

The adhesive sheet of this invention is attached to a surface of the oxygen absorbent parcel in an adhesion strength of 1 to $10^3$ g/20 mm width. When this adhesion strength is too high, the parcel is broken. When it is too low, the adhesive sheet is easily peeled off during the transportation and practically unusable. The adhesive sheet is prepared by coating an adhesive on a substrate at a rate of 5 to 500 g/m$^2$. The adhesive is selected from a rubber-containing adhesive formed mainly of natural rubber or synthetic rubber, an adhesive containing polystyrene as a main component, an adhesive containing polyacrylic acid ester as a main component, etc. The substrate is selected from polypropylene, polyester, polyvinyl chloride or cellophane film, Japanese paper, kraft pulp paper, cloth, etc. The adhesive sheet has an oxygen permeation rate of not more than $3 \times 10^3$ ml/m$^2$·day·atm and a humidity permeability of not more than 300 g/m$^2$·day.

When the oxygen absorbent parcel of this invention is used as a rust preventive for the preservation of electronic products and electronic parts, semiconductors in particular, the gas-permeable packing material is selected from those having a Gurley method gas permeability of 10 to $10^5$ seconds/100 ml, a humidity permeability of 1 to 500 g/m$^2$·day and an oxygen permeation rate of $3 \times 10^3$ to $5 \times 10^6$ ml/m$^2$·day·atm.

The packing material is formed of a base sheet which comprises a fibrous material or a fibrous material and an adhesive and which has a basic weight of 10 to 150 g/m$^2$. The fibrous material is at least one member selected from natural pulps such as kraft pulp, chemical pulp, etc., synthetic fibers of plastics such as nylon, polyethylene, polypropylene, etc., carbon fibers, and the like. The adhesive is selected from natural rubber, butadiene-styrene rubber, chloroprene rubber, and acrylate polymer, polyurethane, vinyl acetate, polyvinyl alcohol, and the like.

At least one of a sizing agent, a pigment, a coagulant, a basic substance, inorganic fillers such as kaolin and adhesives such as polyacrylic acid ester, polyetheneimide, etc., a mixture of at least two of these may be incorporated into the above sheet as required.

The gas-permeable packing material is formed by attaching other material to the above base sheet or by coating or covering the base sheet with other material. Embodiments of the gas-permeable packing material are as follows.

(1) A gas-permeable packing material having a Gurley method gas permeability of 10 to $10^5$ seconds/100 ml and a humidity permeability of 1 to 500 g/m$^2$·day (to be referred to as "gas-permeable packing material A" in some cases hereinafter).

This gas-permeable packing material may be that which is formed by attaching a low-softening point porous film to one surface of a base film and attaching a laminate porous film to the other surface of the base film. The "low-softening point porous film" is a film being formed of a polyolefin such as polyethylene and polypropylene or a polyethylene-vinyl acetate copolymer and having pores. This low-softening point porous film has a thickness of 5 to 100 μm, a porosity of 0.1 to 50% and a pore diameter of 0.1 to 10 mm. The "laminate porous film" is a composite film which is formed by attaching a high-softening point film such as a film of polyamide, polyester, or the like and a low-softening point film to each other and which has a thickness of 5 to 100 μm, a porosity of 0.1 to 50% and a pore diameter of 0.1 to 10 mm.

(2) A gas-permeable packing material having an oxygen permeation rate of $3 \times 10^3$ to $5 \times 10^6$ ml/m$^2$·day·atm and a humidity permeability of 1 to 500 g/m$^2$·day (to be referred to as "gas-permeable packing material B" in some cases hereinafter).

An example of this gas-permeable packing material is that which is formed by attaching a low-softening point porous film to one surface of a base film and attaching or coating an oxygen-permeable film or an oxygen-permeable coating layer to/on the other surface of the base film. The oxygen-permeable film or coating layer has an oxygen permeation rate of $3 \times 10^3$ to $5 \times 10^6$ ml/m$^2$·day·atm. The material therefor is selected from a silicone resin, a copolymer of a silicone resin and other resin, polyethylene, a ethylene-vinyl acetate copolymer, polybutadiene, etc.

(3) Another gas-permeable packing material is that which is formed by attaching a low-softening point porous film to one surface of a base film and attaching a low-softening point porous resin layer/oxygen-permeable film to the other surface of the base film (to be referred to as "gas-permeable packing material C" in some cases hereinafter). The "low softening point resin porous layer/oxygen-permeable film" means a laminate film formed of a low-softening point porous film and an oxygen-permeable film. It has a thickness of 0.1 to 100 μm and an oxygen permeation rate of $3 \times 10^3$ to $5 \times 10^6$ ml/m$^2$·day·atm.

Of the above embodiments, the gas-permeable packing materials B and C are particularly preferred since their humidity permeability is higher than their oxygen permeation rate, the degree of peroxide permeation is low, no fine powder passes through them, and they show good detectability from the adhesive sheet.

In the above embodiments, a reinforcing agent (cloth, etc.) may be attached between the base film and the low-softening point film.

The method for attaching the oxygen absorbent parcel and the adhesive sheet to each other is not specially limited. In general, when the packing material is produced, a gas-permeable material and an adhesive sheet are attached under a load by passing them through a pair of rolls.

The oxygen absorbent composition is weighed out, and packed in a packing material, to which the above adhesive sheet is attached, by means of a forming, filling and closing machine for three sided or four sided seal flexible package, a blister packaging machine, or the like with the low-softening point resin film inside.

The use of the above gas-permeable packing material can prevent volatilization of peroxide which is generated when oxygen is absorbed and affects the rust prevention effect.

When the oxygen absorbent parcel of this invention is used as a rust preventive for the preservation of electronic products and electronic parts, semiconductors in particular, the oxygen absorbent parcel is further packed with the gas-permeable packing material (2) to form a double-packed parcel.

In the double-packed parcel of this invention, the gas permeable packing material (2) is a packing material having an oxygen permeation rate of not less than 1,000 ml/m$^2$·atm·day, a humidity permeability of not less than 1 g/m$^2$·day and a 0.3 μm dust capturing efficiency of not less than 50%, or a packing material having an oxygen permeation rate of not less than 1,000 ml/m$^2$·atm·day and a humidity permeability of not less than 1 g/m$^2$·day and having no pore on an outer surface of the resultant parcel. When the parcel is formed, it shows a dust number of not more than $5 \times 10^4 / 10 \times 10$ cm$^2$ on the parcel surface.

The gas-permeable packing material (2) is used to doubly pack the oxygen absorbent parcel, whereby a double-packed parcel free from adherence and passage of dust is obtained.

Specific examples of the gas-permeable packing material (2) are a packing material (2)-A (see FIG. 1) which is formed by laminating a low-softening point porous film, formed of polyethylene, a copolymer of a polyacrylic acid and polyethylene, or the like, on a microporous film having an oxygen permeation rate of not less than 1,000 ml/m$^2$·atm·day, a humidity permeability of not less than 1 g/m$^2$·day and a 3 $\mu$m dust capturing efficiency of not less than 50%, and a packing material having no pores (2)-B (see FIG. 2) which is formed by laminating a low-softening point porous film, formed of polyethylene, a copolymer of polyacrylic acid and polyethylene, or the like, on one surface of a base material selected from paper or synthetic paper of natural pulp or synthetic pulp, nonwoven fabric prepared by a method (example: Tyvek supplied by du Pont), a microporous film, etc., and laminating an oxygen-permeable resin such as a silicone resin, polybutadiene, or the like on the other surface of the base material.

In the method of packing the oxygen absorbent parcel with the gas-permeable packing material (2), the oxygen absorbent parcel is packed in the gas-permeable packing material (2) with the low-softening point film inside by a sealing method using a hot plate, ultrasonic irradiation-induced hot pressure, etc. However, the packing method itself is not specially limited as far as the packing is possible.

Before the above packing is carried out, dust sticking to that surface of the gas-permeable packing material (2) which is opposite to the low-softening point film side is removed such that the number of dust having a size of 0.3 $\mu$m or more is not more than $5 \times 10^4 / 10 \times 10$ cm$^2$, preferably not more than $1 \times 10^4 / 10 \times 10$ cm$^2$. The dust is removed by a method which comprises neutralizing and removing static electricity generated by electric discharge to float it and absorbing it, a method which comprises applying an ultrasonic wave to dust to float it and absorbing it, a method which comprises bringing dust into contact with an adhesive-coated roll to make the dust stick to the roll, a method which comprises attaching an adhesive sheet formed by arranging an adhesive on a surface of a substrate such as paper, a film, etc., to the gas-permeable packing material (2) and peeling the adhesive sheet, or some other methods.

Further, in some cases, an adhesive sheet formed by coating an adhesive on a substrate such as paper, a film, etc., is attached to the gas-permeable packing material (2) (see FIG. 3), the oxygen absorbent composition is packed in the gas-permeable packing material (2) with the adhesive sheet attached, and the adhesive sheet is peeled off immediately before the resultant double-packed parcel is enclosed in the system together with an article. When necessary, dust remaining on the surface of the parcel from which the adhesive sheet has been peeled off may be removed by one of the above-described methods. In addition, the oxygen absorbent double-packed parcel with the adhesive sheet attached to its surface limits permeation of oxygen and water to a graft extent and inhibits degradation of rust prevention performance, and it can be allowed to stand under atmosphere for a long period of time.

When the oxygen absorbent parcel is packed in the gas-permeable packing material (2) from which dust has been removed by one of the above methods, the site for this packing is isolated from the site for the preparation of the oxygen absorbent parcel, and nitrogen gas or air in which the number of dust having a size of 0.3 $\mu$m is not more than $3 \times 10^4 / 1$ cubic feed is introduced into its working atmosphere.

This invention also provides a method for preserving a photograph, which comprises enclosing the oxygen absorbent parcel of this invention and a photograph, or the oxygen absorbent parcel of this invention, a humidity adjusting agent having an equilibrium relative humidity of 10 to 70% to and a photograph with a packing material having an oxygen permeation rate, at 25° C., of not more than 10 ml/m$^2$·atm·day and a humidity permeability, at 25° C., of not more than 10 g/m$^2$·day.

Specific examples of the object to be preserved are a photosensitive material not exposed, a positive or negative image developed and fixed, and a photograph fixed on a photographic paper.

In this invention, the packing material has an oxygen permeation rate, at 25° C., of not more than 10 ml/m$^2$·atm·day and a humidity permeability, at 25° C., of not more than 10 g/m$^2$·day (a material having such properties will be simply referred to as "packing material" hereinafter). When the preservation for about half a year is required, packing materials such as stretched PP/PE, polyvinylidene chloride-coated stretched nylon/PE, polyvinylidene chloride-coated polyester/PE, polyvinylidene chloride-coated stretched nylon/evaporation-deposited aluminum/PE, etc., are preferred.

In particular, when a negative or positive image, a movie film, an important picture taken in the past, etc., are required to be preserved for one year or more without unsealing them, a packing material of which the oxygen permeation rate and water vapor permeability are substantially zero is preferred. Such a packing material is specifically selected from a metal can having an air-tight structure, a multilayer film (three or more layers) having a basic structure of a thermocompression-bonded resin layer/thin metal film/protective resin layer, and the like, in particular, stainless steel is preferred for a metal can, and a multilayer film formed of low-density polyethylene (PE) or polypropylene (PP) as a thermocompression bonded resin layer, aluminum or an alloy thereof as a thin metal layer and stretched nylon or polyester as a protective resin layer is preferred as such.

The humidity adjusting agent used in this invention may be an aqueous solution of a water-soluble organic compound. The water-soluble organic compound is that which can be freely mixed with water, and specifically selected from polyethylene glycol, polypropylene glycol, amines such as triethanolamine and tripropanolamine, polyhydric alcohols such as trimethylpropane, trimethylolethane, glycerin and neopentyl glycol, and the like.

The above humidity adjusting agent is generally supported on a carrier.

The carrier is specifically selected from paper, cloth, nonwoven fabric, and porous adsorbents such as activated alumina, zeolite, activated clay, pearlite, etc.

The humidity in the system, defined by the humidity adjusting agent, is in the range of RH of 10% to RH of 50%, preferably RH of 20% to RH of 40% so as to prevent fusion of gelatin caused when the humidity is too high, physical destruction such as cracking, peeling, etc., caused when the humidity is too low and biological destruction caused due to mold.

In the method of preservation of a photograph, provided by this invention, the oxygen absorbent parcel plays a leading role to maintain the oxygen concentration inside the system at not more than 0.1% for a long period and prevent oxygen-induced discoloration of photograph-constituting materials.

In the use of oxygen absorbents outside the scope of this invention, such as iron powder-containing, ascorbic acid-containing or dithionite-containing absorbents, water is required for oxygen absorption, and preservation at a high humidity is therefore inevitable. These requirements are the cases for occurrence of mold and contract of a base film, and dyestuffs are changed in properties due to hydrogen and sulfurous dioxide gas formed.

According to this invention, there is provided a method of preserving a bearing, which comprises enclosing the oxygen absorbent parcel and the bearing in a container having gas-barrier properties.

In this invention, the size, form, material and use of the bearing to be preserved are not critical. Bearings to be preserved, as an object, are those from which it is always required to remove oil and dirt before use since the oil and dirt affect not only a bearing but also other parts located around it, i.e. a rotor bearing for electronic machines and components, etc.

The oxygen absorbent parcel used for the preservation of a bearing is formed by packing an oxygen absorbent composition which contains, as essential component, a linear hydrocarbon polymer having an unsaturated group or a mixture of a linear hydrocarbon polymer having an unsaturated group with an unsaturated fatty acid compound and an oxidation promoter and which optionally contains a basic substance and/or an adsorption substance with a gas-permeable packing material having an oxygen permeation rate of not less than 1,000 ml/m$^2$·atm·day. This gas-permeable packing material is not specially limited with regard to its constitution and material.

Such a gas-permeable packing material is selected from a film, a sheet and a laminate prepared by laminating a film on a base material such as paper or nonwoven fabric.

The oxygen absorbent parcel is produced by enclosing the composition in this gas-permeable packing material and bonding sides of the gas-permeable packing material by a heat-seal method, etc.

The parcel produced above may be further packed with a gas-permeable packing material having an oxygen permeation rate of not less than 1,000 ml/m$^2$·atm·day, a humidity permeability of not less than 1 g/m$^2$·day and a capturing efficiency of not less than 50% for dust having a size of not less than 0.3 μm when air is introduced.

The form of the parcel is not specially limited, and may be selected from the forms of a pouch, sheet, blister package, etc.

The container having gas-barrier properties in this invention has an oxygen permeability, per a volume of 100 ml, of not more than 10 ml/day, preferably not more than 5 ml/day, and a humidity permeation rate of not more than 10 g/day, preferably not more than 5 g/day, and the form and material thereof are not specially limited. One example is a container made of a synthetic resin or metal.

Such a container is suitably selected from a metal can of iron, a tin plate, stainless steel or aluminum, a case formed of a synthetic resin such as polyethylene, polypropylene, nylon, polyester, vinyl chloride, polystyrene, polycarbonate, or the like, and a bag formed of a composite film prepared by laminating some of materials such as vinyl chloride, vinylidene chloride, aluminum foil, evaporated aluminum, nylon polyethylene, polypropylene, polyester, etc., and sealed by a heat sealing method or the like.

In order to improve the gas-barrier properties of a metal can and a case formed of a synthetic resin, a packing may be provided between its body and lid.

The method for enclosing the oxygen absorbent parcel in such a container together with a bearing is not specially limited.

For example, there are some methods in which a container is provided with a reception portion for the oxygen absorbent parcel and the oxygen absorbent parcel is enclosed separately from a bearing; a bearing is wrapped in paper or a synthetic resin film and the oxygen absorbent parcel is placed in contact with an outer surface of the wrapped bearing; and the like.

When a container enclosing a bearing and the oxygen absorbent parcel is sealed, an inert gas such as nitrogen, argon, or the like is sometimes substituted for air in the container. Further, the pressure inside the container may be reduced.

According to this invention, there is provided a method for preserving a powder being oxidized, which comprises enclosing the oxygen absorbent parcel and the powder being oxidized in a container having gas-barrier properties and sealing the container.

In this invention, the powder being oxidized to be preserved is that which is oxidized with oxygen, and the method of this invention is applicable to any powder having an oxygen absorption rate of not less than 0.01 ml·O$_2$/g·month without any special limitation. Examples of powders to which the method of this invention is preferably applied to are metal or carbon powders having a grain size of not more than 5 mm. Specific examples of such powders are powders mainly used as a material for a sintered part of machines and electronic parts, a magnetic substance, a solder, an electrically conductive paste, etc., such as a copper powder, silver powder, iron powder, a powder of a rare earth metal, lead or tin, a powder of an alloy of these metals (to be simply referred to as "metal powder" hereinafter) and carbon powders as a material for a magnetic substance and a heat-resistant part.

The oxygen absorbent parcel and the container having gas-barrier properties the same as those used in the above method for preserving a bearing.

The form when a powder being oxidized is preserved by enclosing the oxygen absorbent parcel and the powder being oxidized in a container and sealing the container is not specially limited. Preferably, a powder being oxidized is preserved by a method (1) in which a container is provided with a reception portion for said parcel, or a method (2) in which the powder being oxidized is packed in a film of a synthetic resin such as polyethylene, polypropylene permeable to water and oxygen and the oxygen absorbent parcel is placed the container by arranging inside and/or outside of the above powder being oxidized package. Particularly preferred is the method (2) in which the degree of inclusion of powder in a sealed portion is low and airtightness of a container can be easily maintained.

According to this invention, there is provided a method of preserving a metal or a product containing a metal, which comprises enclosing the oxygen absorbent parcel and natural pulp and the metal or the product containing a metal in a container having gas-barrier properties and sealing the container.

Examples of the metal or product containing a metal as an object to be preserved in this invention are a shadow mask made of iron, copper alloy, a lead frame, etc., and the lead frame is a typical example. The "lead frame" is that which is bonded to an IC chip, formed by (physically and chemically) polishing a surface of a shaped copper alloy, and partly plated with silver and gold.

The natural pulp used in this invention is that which prevents dew condensation by absorbing superfluous water before dew is formed on a metal surface in the packed system due to a sudden change in ambient temperature and humidity. The natural pulp is not specially limited, and is selected from kraft pulp, thermomechanical pulp, etc. Preferred is pulp which is extracted to give water having pH of 4 to 10 and a sulfur and chlorine content of not more than 100 ppm and which has a water content of not more than 12%. More preferred is pulp which is extracted to give water having pH of 5.5 to 8.5 and a sulfur and chlorine content of not more than 50 ppm and which has a water content of not more than 6%. The form of the pulp is not specially limited, and yet, it is preferably sheet-like. This sheet has a basis weight of 20 to 300 g/square meter, is used in a manner that it is placed between metals or it wraps a metal.

The oxygen absorbent parcel and container having gas-barrier properties are the same as those used for the above method for preserving a bearing.

This invention also discloses an oxygen absorbent composition being different from the above oxygen absorbent composition in component and containing an unsaturated fatty acid compound with a humidity adjusting agent; a parcel formed of the oxygen absorbent composition having an unsaturated fatty acid compound as essential component and a novel packing material; and a preservation method which comprises enclosing this novel oxygen absorbent parcel in a container together with several kinds of articles and sealing the container.

That is, this invention basically relates to a known oxygen absorbent composition containing an unsaturated fatty acid compound as an essential component and optionally, one or not less than two of an oxidation promoter, a basic substance and an adsorption substance; and this invention also relates to a novel composition comprising this oxygen absorbent composition and a substance having a humidity adjusting function; and an oxygen absorbent parcel formed by packing any one of these compositions with a gas-permeable packing material or a novel gas-permeable packing material impermeable to fine dust or capable of protecting an article from fine dust.

The "unsaturated fatty acid compound", "oxidation promoter", "basic substance" and "adsorption substance" are the same as those components constituting the foregoing "oxygen absorbent composition which contains a linear hydrocarbon polymer having an unsaturated group or a mixture of a linear hydrocarbon polymer having an unsaturated group with an unsaturated fatty acid compound as main components to absorb oxygen".

And, the substance having a humidity adjusting function, used in combination with the "known oxygen absorbent composition containing an unsaturated fatty acid compound as an essential component and optionally, one or not less than two of an oxidation promoter, a basic substance and an absorption substance" is the same as the foregoing humidity adjusting agent.

In the parcel formed by packing a known oxygen absorbent composition containing an unsaturated fatty acid compound as an essential component and optionally containing one or not less than two of an oxidation promoter, a basic substance and an adsorption substance with a gas-permeable packing material and further covering the resultant parcel with an adhesive sheet comprising an adhesive and a sheet with attaching a surface of the parcel to an adhesive layer of the adhesive sheet, all the components other than the unsaturated fatty acid compound are the same as those used in the foregoing parcel.

In the double-packed parcel formed by packing an oxygen absorbent composition containing an unsaturated fatty acid compound as an essential component and optionally containing one or not less than two of an oxidation promoter, a basic substance and an adsorption substance with a gas-permeable packing material and further packing the resultant oxygen absorbent parcel with a gas-permeable packing material having a humidity permeability of not less than 1 g/m$^2$·day, an oxygen permeation rate of not less than 1,000 ml/m$^2$·atm·day and a capturing efficiency of not less than 50% for dust having a size of 3 μm or greater, all the components are the same as those used for the foregoing parcel except for the unsaturated fatty acid compound in place of the linear hydrocarbon polymer having an unsaturated bond or the mixture of the linear unsaturated hydrocarbon polymer having an unsaturated bond with the unsaturated fatty acid compound.

And, the method of preserving a photograph, a bearing, an oxidizing powder, a metal or a product containing a metal is the same as the foregoing method except for the use of the unsaturated fatty acid compound in place of the linear unsaturated hydrocarbon polymer having an unsaturated group or the mixture of the linear unsaturated hydrocarbon polymer having an unsaturated group with the unsaturated fatty acid compound.

The gas-permeable packing material (2) used for the oxygen absorbent double-packed parcel of this invention and embodiments of said double-packed parcel will be explained by reference to Figures.

FIG. 1 shows a packing material (2)-A formed by laminating a low-softening point porous film 31 such as a film of polyethylene or a polyacrylic acid-ethylene copolymer on a microporous film 21 as a base material.

Figure 2:
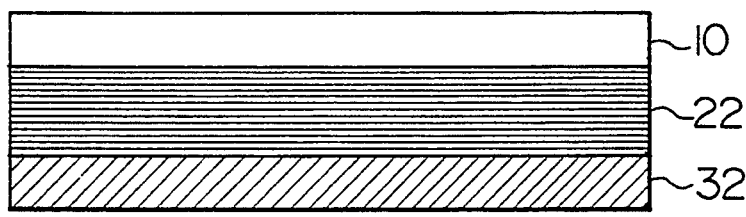

FIG. 2 shows a packing material (2)-B having no pore, formed by laminating a low-softening point porous nonwoven fabric 32 on one surface of nonwoven fabric paper as a base material 22 and laminating an oxygen-permeable resin 10 such as a silicone resin, polybutadiene, etc, on the other surface of the base material.

Figure 3:
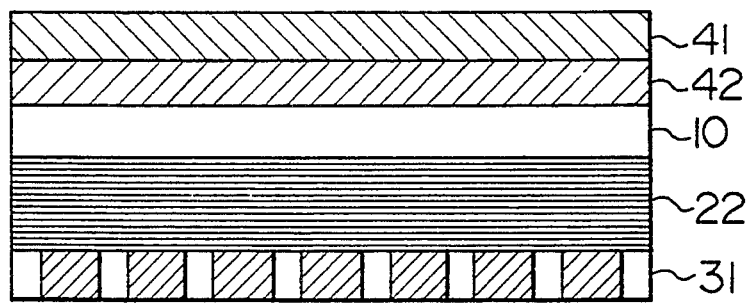
FIG. 3 shows one embodiment in which an adhesive sheet is attached to a gas-permeable packing material (2).

FIG. 3 shows a packing material (2)-B formed by laminating a low-softening point nonwoven porous film 31 on one surface of a nonwoven fabric or paper as a base material 22, laminating an oxygen-permeable resin 10 such as a silicone resin, polybutadiene, etc, on the other surface of the base material and attaching an adhesive sheet 41, 42 thereon.

Figure 4:
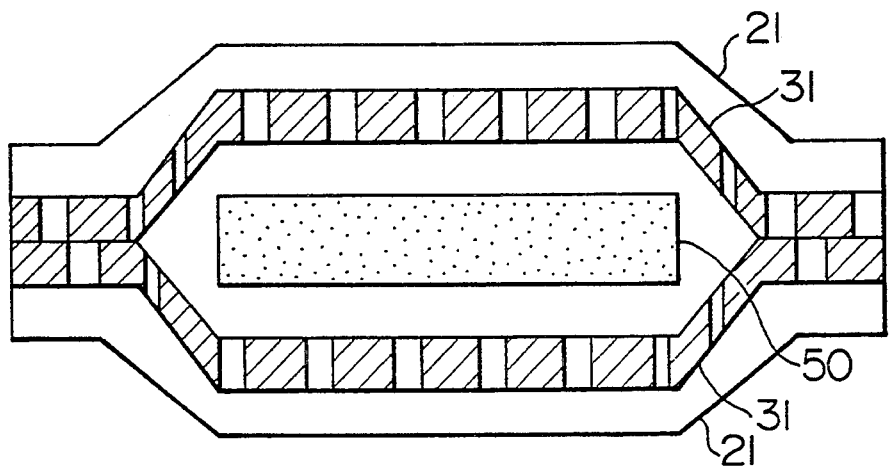
FIG. 4 shows one embodiment of a single-packed parcel formed by packing an oxygen absorbent composition.

FIG. 4 shows one embodiment of a single-packed parcel formed by packing an oxygen absorbent composition 50 of this invention with a gas-permeable packing material (it is a laminate formed by laminating a low-softening point porous film 31 on a microporous film 21 as a base material).

Figure 5:
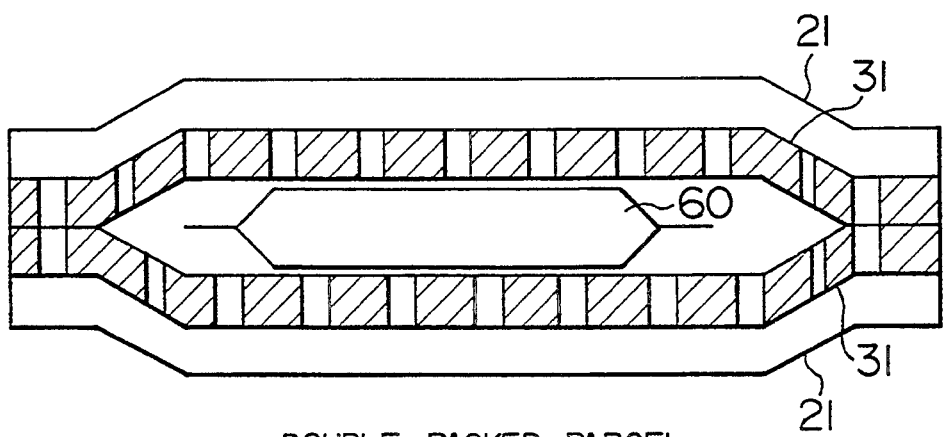
FIG. 5 shows one embodiment of a double-packed parcel formed by packing a single-packed parcel with a gas-permeable packing material.

FIG. 5 shows an oxygen absorbent double-packed parcel formed by packing a single-packed parcel 60 with the packing material (2)-A shown in FIG. 1.

Embodiments in which a powder being oxidized is preserved by enclosing the oxygen absorbent parcel of this invention and the powder being oxidized in a container and sealing the container will be explained below by reference to drawings.

Figure 6:
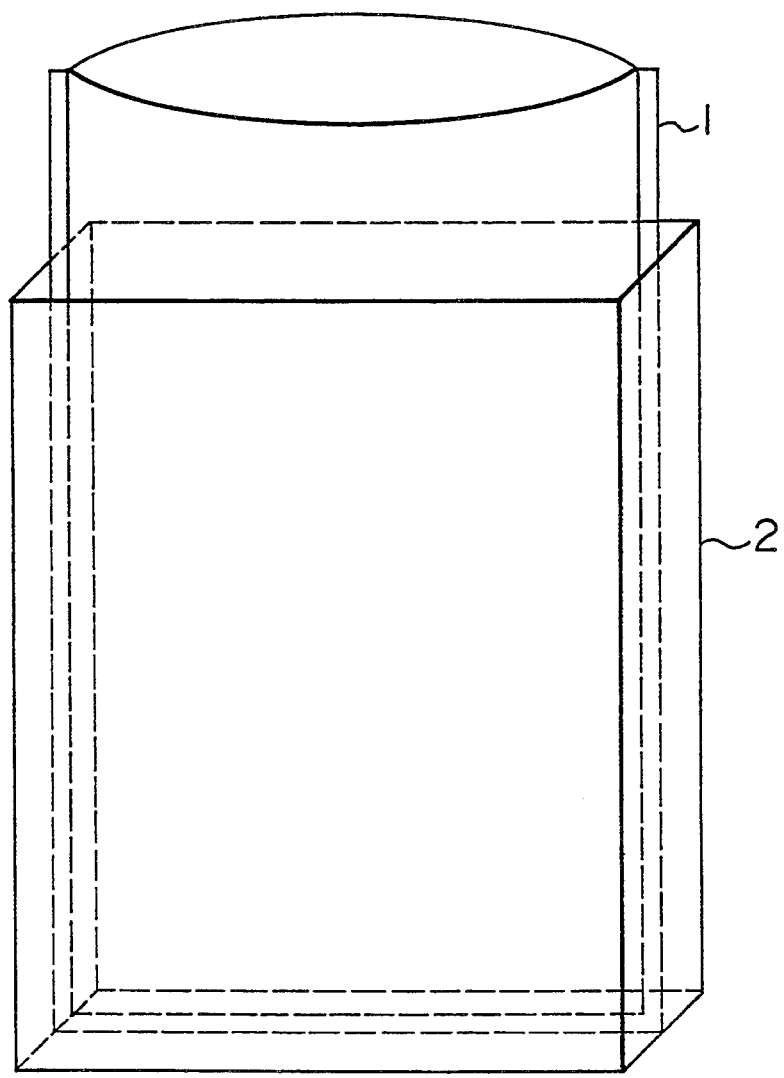
FIG. 6 shows one embodiment in which no powder being oxidized is contained in a container having a gas-barrier properties.

FIG. 6 shows an inside bag 1 formed of a synthetic resin such as polyethylene, polypropylene, etc., permeable to water and oxygen, and a container 2 having gas-barrier properties before a powder being oxidized is filled, in which an opening portion of the inside bag 1 is extending far out of an opening portion of the container.

Figure 7:
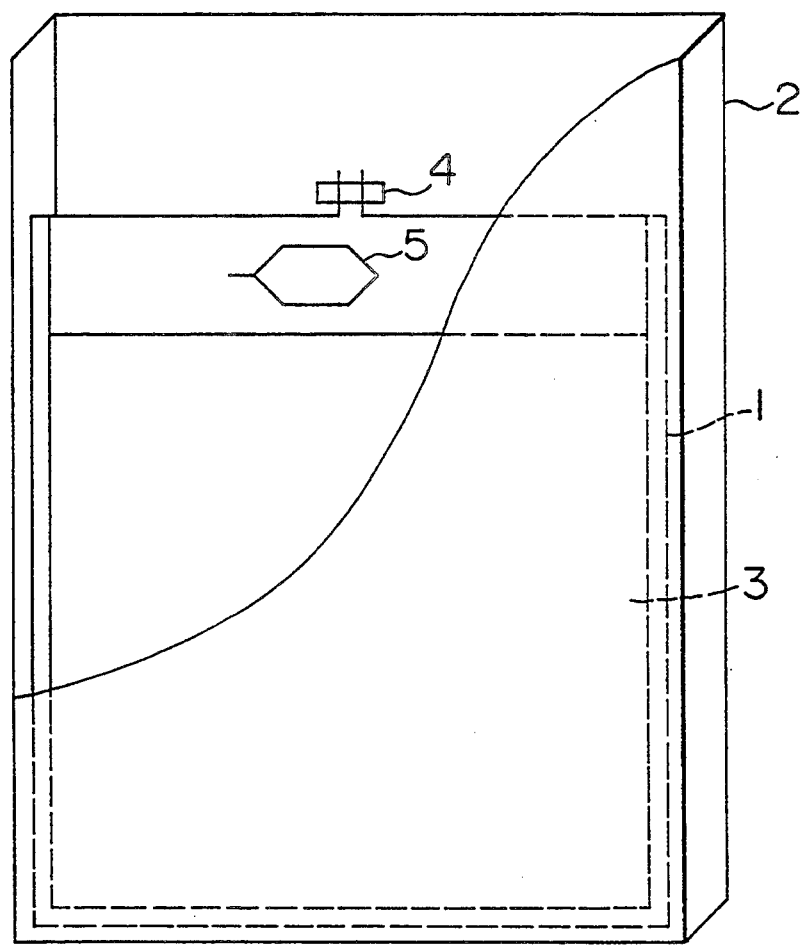
FIG. 7 shows one embodiment in which a powder being oxidized and an oxygen absorbent parcel are contained in an inside bag which is placed in a container having gas-barrier properties.

FIG. 7 shows an embodiment in which the inside bag 1 is filled with a powder being oxidized 3 and sealed with an inside bag sealing portion 4, and the inside bag 1 and an oxygen absorbent parcel 5 of this invention are placed in the container 2 having gas-barrier properties.

Figure 8:
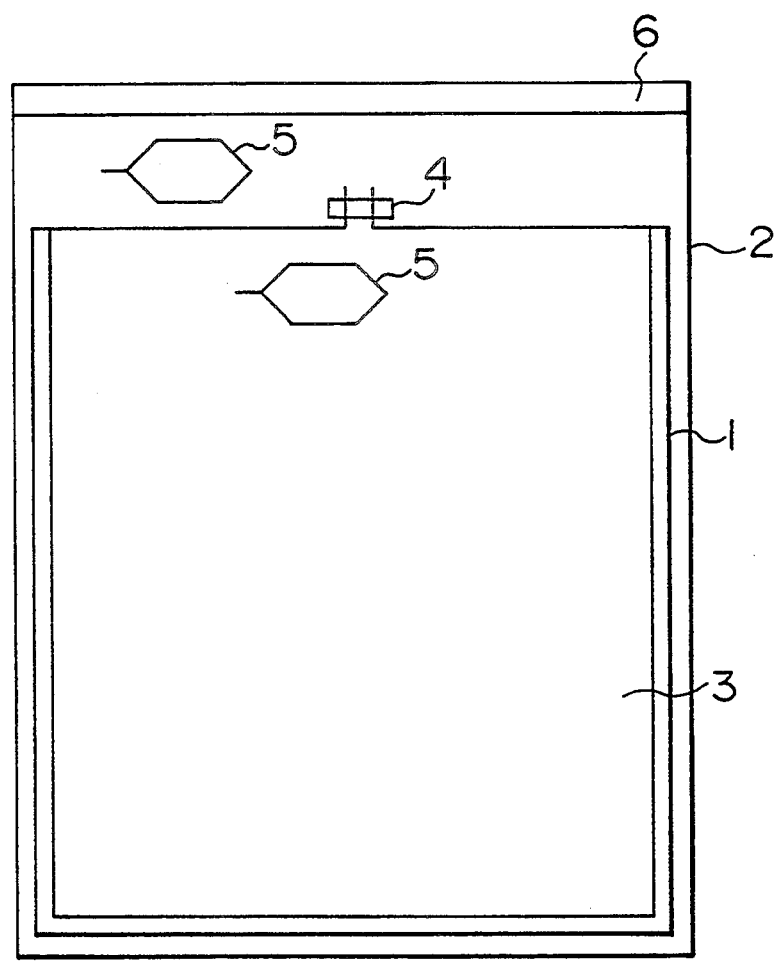
FIG. 8 shows one embodiment in which a powder being oxidized and an oxygen absorbent parcel which are enclosed in an inside bag are enclosed in a container having gas-barrier properties together with another parcel.

FIG. 8 shows an embodiment in which the inside bag 1 is filled with a powder being oxidized 3 and sealed with an inside bag sealing portion 4, and the inside bag 1 and an oxygen absorbent parcel 5 of this invention are placed in the container 2 having gas-barrier properties and sealed with an outer package sealing portion 6.

This invention will be explained more specifically below by reference to Examples.

Examples 1-7 (Preparation of Granular Composition)

0.2 Gram of a catalyst was dissolved or suspended in 1.0 g of a linear hydrocarbon polymer having unsaturated group or a mixture of a linear hydrocarbon polymer having unsaturated group with an unsaturated fatty acid compound, and the resultant mixture was impregnated into 5 g of a particulate adsorbent. Then, 0.5 g of slaked lime was added to the allowed to cover a surface of the particulate adsorbent to form a granular composition. Table 1 shows components of the composition, a time required to attain 0.1% of oxygen, a maximum oxygen absorption amount and a change in oxygen concentration within a system with time.

EXAMPLES 8-10

0.5 Gram of an isoprene polymer (molecular weight 5,000), a mixture liquid of 0.5 g of soybean oil fatty acid with an unsaturated fatty acid transition metal salt, a powdery basic substance and a powdery adsorbent were homogeneously mixed with a cutter mixer. The resultant mixture was allowed to stand at 25° C. for 10 minutes to change itself into a solid mass. The solid mass was pulverized with a granular to form a granular composition having a size of about 3 mm. Table 2 shows components of this composition, a time required to attain 0.1% of oxygen, a maximum oxygen absorption amount and a change in oxygen concentration within a system with time.

EXAMPLE 11

0.3 Gram of cobalt salt of tall oil fatty acid was added to a mixture of 0.5 g of a butadiene polymer with 0.5 g of tall oil fatty acid, and the resultant mixture was impregnated into a 5×5 cm kraft pulp sheet having a basis weight of 100 g/m² to form a sheet (I). A mixture liquid of 0.7 g of glycerin (for use in dynamite) with 0.1 g of triethanolamine was impregnated into 5×5 cm kraft pulp sheet having a basis weight of 100 g/m² to form a sheet (II). Table 2 shows a time required to attain 0.1% of oxygen, a maximum oxygen absorption amount and a change in oxygen concentration within a system with time with regard to this sheet-like composition.

Preparation of Parcel

The composition prepared in each of Examples 1 to 10 and 2.5 g of granular calcium oxide were packed with a 70×70 mm packing material coated with a silicone resin with a porous polyethylene surface thereof inside, and the resultant parcels were heat sealed on sides.

Either one of the composition sheet (I) and composition sheet (II) obtained in Example 11 was placed on the other of them. Then the resulting sheets (I) and (II) was packed with a 70×70 mm packing material coated with a silicone resin on the surface.

The packing material used for this parcel was prepared as follows. 100 Parts of a silicone resin monomer (SD7328, supplied by Toray Silicone, toluene solution having a resin content 30%) and 0.6 part of a catalyst (SRX212, supplied by Toray Silicone) were in 500 parts of toluene, the resultant solution was coated on a wood free paper having a basis weight of 50 g/m² at a rate of 20 g/m² (resin content 1 g/m²) and the silicone resin was polymerized at 140° C. for 1 minute.

Porous polyethylene (Pore B type, supplied by Shin-Nippon Aruku Co., Ltd.) was laminated on that surface of the wood free paper which was opposite to the surface coated with the silicone resin, and the resultant laminate was sealed on sides with this polyethylene surface inside under heat pressure at 140° C., 15 kg/cm² for 3 seconds.

Definition of Oxygen Absorption Rate and Method of Measurement Thereof

One parcel was enclosed in 15×20 cm bag formed of a vinylidene chloride-coated stretched nylon/polyethylene composite film together with 250 ml of air, and the bag is sealed and stored at 25° C. A change of the oxygen concentration inside the bag with time was measured, and a time required to attain an oxygen concentration of 0.1% was determined and considered to be an oxygen absorption rate. Tables 1, 2 and 3 show the results. After the oxygen concentration of 0.1% was attained, the gas was still preserved at a temperature of 40° C. and RH of 100% to measure a change of oxygen concentration in the system with time. Tables 1, 2 and 3 show the results.

Definition of Maximum Oxygen Absorption Amount and Method of Measurement Thereof One parcel was enclosed in a 40×50 cm bag formed of a vinylidene chloride-coated stretched nylon/polyethylene composite film together with 3,000 ml of air, and the bag was sealed and stored at 25° C. An oxygen absorption amount determined on the basis of a decrease in the oxygen concentration within the bag after one month was taken as a maximum oxygen absorption amount. Tables 1, 2 and 3 show the results.

Comparative Example 1

0.2 Gram of a 10% calcium aqueous solution was homogeneously mixed with a mixture of 1 g of a 60- mesh or smaller reduced iron powder with 1 g of powdered activated carbon to obtain an oxygen-absorbing composition. This composition was packed with the same packing material as that in Examples 1 to 7 in the same manner as in Examples 1 to 7 to prepare a parcel of an oxygen absorbent composition. This parcel was measured for an oxygen absorption rate, a maximum oxygen absorption amount and a change of oxygen concentration in a system with time in the same manner as in Examples 1 to 7. Table 3 shows the results.

Comparative Example 2

The parcel obtained in comparative Example 1 and a parcel formed by packing 3 g of a silica gel (A-type) with the same packing material as that in Example 1 were together measured for an oxygen absorption rate, a maximum oxygen absorption amount and a change of oxygen concentration in a system with time in the same manner as in Example 1. Table 3 shows the results.

Comparative Example 3

0.2 Gram of cobalt salt of soybean fatty acid was dissolved in 1.0 g of tall oil fatty acid, and the resultant mixture was impregnated into 5 g of a particulate zeolite. 0.5 Gram of slaked lime was allowed to cover a surface of the zeolite to prepare a granular composition. This composition was packed with the same packing material as that in Examples 1 to 7 in the same manner as in Examples 1 to 7 to give an oxygen absorbent parcel. This parcel was measured for an oxygen absorption rate, a maximum oxygen absorption amount and a change of oxygen concentration in a system with time in the same manner as in Example 1. Table 3 shows the results.

TABLE 1

| Example | Unsaturated linear hydrocarbon polymer kind | weight | 1. Unsaturated fatty acid compound 2. Catalyst 3. Adsorbent 4. Note kind | weight | Time to attain oxygen concentration of 0.1% hr | Maximum oxygen absorption amount ml | Change of oxygen concentration in system with time (%) 28th day | 46th day | 74th day |
|---|---|---|---|---|---|---|---|---|---|
| 1 | Isoprene polymer Molecular (weight 5000) | 1.0 g | 1. — 2. Iron naphthenate 3. Activated carbon | 0.2 g 5.0 g | 15 | 250 | 0.02 | 0.03 | 0.05 |
| 2 | Isoprene polymer Molecular (weight 5000) | 0.5 g | 1. Soybean oil 2. Ferrous sulfate 3. Activated carbon | 0.5 g 2.0 g 5.0 g | 12 | 340 | 0.02 | 0.02 | 0.03 |
| 3 | Butadiene polymer Molecular (weight 10000) | 0.3 g | 1. Tall oil fatty acid 2. Cobalt salt of soybean oil fatty acid 3. Zeolite | 0.7 g 0.2 g 5.0 g | 9 | 450 | 0.02 | 0.02 | 0.03 |
| 4 | Butadiene polymer Molecular (weight 10000) | 0.5 g | 1. Soybean oil 2. Copper salt of soybean oil fatty acid 3. Silica gel | 0.5 g 0.2 g 5.0 g | 12 | 330 | 0.02 | 0.02 | 0.03 |
| 5 | Squalene | 1.0 g | 1. — 2. Iron salt of soybean oil fatty acid 3. Pearlite | 0.2 g 5.0 g | 15 | 270 | 0.03 | 0.04 | 0.05 |
| 6 | Squalene | 0.5 g | 1. Soybean oil 2. Iron salt of soybean oil fatty acid 3. Activated | 0.5 g 0.2 g 5.0 g | 13 | 320 | 0.02 | 0.03 | 0.04 |
| 7 | Squalene | 0.5 g | 1. Soybean oil 2. Cobalt naphthenate 3. Activated carbon | 0.5 g 0.2 g 5.0 g | 10 | 350 | 0.02 | 0.02 | 0.03 |

Note) Examples 1 to 7 used 2.5 g of calcium oxide as a basic substance

TABLE 2

| Example | Oxygen absorbent composition 1. Catalyst 2. Basic substance 3. Adsorbent 4. Other Note kind | weight | Time to attain concentration of 0.1% hr | Maximum oxygen absorption amount ml | Change of oxygen concentration in system with time (%) 28th day | 45th day | 74th day |
|---|---|---|---|---|---|---|---|
| 8 | Isoprene polymer iron salt of soybean oil fatty acid, respectively 0.5 g | 1. Cobalt naphthenate 2. Slaked lime 3. Activated carbon | 0.1 g 1.0 g 4.0 g | 10 | 360 | 0.02 | 0.03 | 0.03 |
| 9 | | 1. Iron salt of tall oil fatty acid 2. Magnesium hydroxide 3. Activated carbon | 0.5 g 2.0 g 4.0 | 15 | 290 | 0.03 | 0.04 | 0.06 |
| 10 | | 1. Cobalt salt of tall oil fatty acid 2. Magnesium hydroxide 3. Zeolite | 0.05 g 2.0 g 6.0 g | 10 | 390 | 0.02 | 0.03 | 0.05 |
| 11 | Butadiene polymer 0.5 g | Tall oil fatty acid 1. Cobalt salt of tall oil fatty acid 4. Glycerin | 0.5 g 0.3 g 0.7 g | 15 | 300 | 0.03 | 0.03 | 0.04 |

TABLE 2-continued

| | Oxygen absorbent composition<br>1. Catalyst<br>2. Basic substance<br>3. Adsorbent<br>4. Other Note | | Time to attain concentration of 0.1% | Maximum oxygen absorption amount | Change of oxygen concentration in system with time (%) | | |
|---|---|---|---|---|---|---|---|
| Example | kind | weight | hr | ml | 28th day | 45th day | 74th day |
| | Triethanolamine | 0.1 g | | | | | |

Note) Examples 8 to 10 used 2.5 g of calcium oxide as a basic substance.

TABLE 3

| Comparative Example | Oxygen absorbent composition Note | | Time to attain concentration of 0.1% | Maximum oxygen absorption amount | Change of oxygen concentration in system with time (%) | | |
|---|---|---|---|---|---|---|---|
| | kind | weight | hr | ml | 28th day | 46th day | 74th day |
| 1 | Reducing iron powder | 1.0 g | 16 | 200 or less | 0.01 or less | 0.01 or less | 0.01 |
| | Powdered activated carbon | 1.0 g | | | | | |
| | 10% calcium chloride aqueous solution | 0.2 g | | | | | |
| 2 | Reducing iron powder | 1.0 g | 18 | 85 | 0.15 | 0.35 | 0.94 |
| | Powdered active carbon | 1.0 g | | | | | |
| | 10% calcium chloride aqueous solution | 0.2 g | | | | | |
| | Silicagel (A type) | 3.0 g | | | | | |
| 3 | Tall oil fatty acid | 1.0 g | 20 | 160 | 0.14 | 0.25 | 0.44 |
| | Cobalt salt of soybean oil fatty acid | 0.2 g | | | | | |
| | Particulate zeolite | 5.0 g | | | | | |
| | Slaked lime | 0.5 g | | | | | |

Note) Comparative Examples 1 to 3 used 2.5 g of calcium oxide as a basic substance

Example 12, and Comparative Examples 4 and 5

90 Grams of soybean oil was added to 230 g of a 10% sodium hydroxide aqueous solution together with 400 ml of water having a temperature of 90° C. for saponification, whereby an aqueous solution of sodium salt of soybean oil fatty acid was obtained. 270 Grams of a 10% aqueous solution of ferric chloride was added to the aqueous solution obtained above, a water layer was separated, and an oil layer was washed with 500 cc of hot water three times to give 90 g of an iron salt of soybean oil fatty acid.

180 Grams of quick lime was added to and fully mixed with the iron salt of soybean oil fatty acid with stirring to solidify it, and the solid was pulverized with a cutter mixer to obtain an oxygen absorbent.

Further, a humidity adjusting agent was prepared by fully mixing 8 g of water with 92 g of glycerin, and impregnating the resultant mixture into 300 g of a silica gel. The theoretical value of the equilibrium relative humidity of this humidity adjusting agent was 30%, while its equilibrium relative humidity was found to be 33%.

3 Grams of the above oxygen absorbent and 5 g of the humidity adjusting agent were put into a small bag to prepare an oxygen absorbent composition.

Comparative Example 4 used a commercially available oxygen absorbent, formed by an iron powder coated with sodium chloride and a porous adsorbent impregnating a sodium chloride saturated solution therein. Comparative Example 5 used a commercially available oxygen absorbent, formed by an iron powder coated with sodium chloride and a porous adsorbent impregnating a calcium chloride saturated solution therein.

Bags having a size of 150 mm×200 mm and formed of an aluminum foil-laminated packing material were fully washed with ion-exchanged water, and used as an outer bag to enclose an oxygen absorbent.

The above three oxygen absorbents were enclosed in these bags together with 250 cc of air having a relative humidity of 50% (25° C.) and the bags were sealed.

After 16 hours, 1 cc of gas was extracted from each of systems in which oxygen absorption had finished and subjected to gas chromatography to determine a sulfur compound and hydrogen. Table 4 shows the results.

TABLE 4

| | Sulfur compound ppm | Hydrogen ppm | Relative humidity at equilibrium % |
|---|---|---|---|
| Example 12 | N.D. | N.D. | 33 |
| Comparative Example 4 | 0.1 | 18 | 75 |
| Comparative Example 5 | 0.1 | 32 | 32 |

N.D.: Not detected

EXAMPLE 13

A porous polyethylene film (porous B-type, thickness 30 μm, supplied by Shin-Nippon Aruku Co., Ltd.) was attached to one surface of a woodfree paper having a basis weight of 50 g/m$^2$ under heat pressure at 140° C. at 15 kg/cm$^2$ for 3 seconds, and at the same time, a laminate porous film (15 μm PET/15 μm PE composite porous film, thickness 30 μm, porosity 3%) was also attached to the other surface of the woodfree paper under the same conditions, whereby a gas-permeable packing material A was obtained.

100 Parts of a silicone resin monomer (SD7328, toluene solution having a resin content of 30%, supplied by Toray Silicone) was dissolved in 500 parts of toluene together with 0.6 part of a catalyst (SRX212, platinum catalyst, supplied by Toray Silicone), and the resultant solution was coated on a woodfree paper (having a basis weight of 50 g/m$^2$) at a rate of 20 g/m$^2$ (resin content 1 g/m$^2$), and the silicon resin was polymerized at 140° C. for 1 minute.

A porous polyethylene film (B-type having pores, thickness 30 μm, supplied by Shin-Nippon Aruku Co., Ltd.) was attached to that surface of the woodfree paper which was opposite to the silicone resin-coated surface under heat pressure at 140° C. at 15 kg/cm$^2$ for 3 seconds, whereby a packing material B was obtained.

An adhesive sheet formed by coating 13 g/m$^2$ of butyl polyacrylate on a polyester film (thickness 12 μm) was attached to each of the packing materials A and B obtained above such that the butyl polyacrylate surface of the adhesive sheet was in contact with that surface of each of the packing materials A and B which was opposite to the porous polyethylene film-attached surface. And, each of the packing materials A and B to which the adhesive sheet was attached was passed under a load of 1 kg through a pair of rolls.

Each of the following compositions was packed in the above adhesive sheet-attached packing material A or B with the porous polyethylene surface inside by means of a forming, filling and closing machine for three sides seal flexible package, whereby oxygen absorbent (rust-preventive) parcels were obtained.

Granular Composition-1

1 Gram of an iron salt of soybean oil fatty acid, 0.5 g of slaked lime and 1 g of powdered activated carbon were homogeneously mixed with a cutter mixer, and the resultant mixture was allowed to stand at 25° C. for 10 minutes to form a solid mass. The mass was pulverized with a granulator to form granules having a grain size of not more than 3 mm, and the granules were further mixed with 2.5 g of particulate MgO.

Granular Composition-2

0.1 Gram of an iron salt of soybean oil fatty acid, 0.4 g of soybean oil fatty acid and 0.5 g of a butadiene polymer (average molecular weight 5,000) were homogeneously mixed, and the resultant mixture was impregnated into 2 g of particulate activated carbon to give a granular composition. 3 Gram of this composition was mixed with 2.5 g of particulate calcium to form a Granular composition-2.

Sheet-Shaped Composition

1 Gram of an iron salt of soybean oil fatty acid was impregnated into a 50×50 mm paper sheet having a basis weight of 100 g/m$^2$ to form a sheet A, and 1 g of glycerin was impregnated into a 50×50 mm paper sheet having a basis weight of 100 g/m$^2$ to form a sheet B, whereby a sheet-shaped composition of a pair of the sheets A and B was obtained.

Film-Shaped Composition

1 Gram of a silica gel A-type having a grain size of 40 mesh or smaller was kneaded with 4 g of polyethylene at 200° C., and a 3 mm sheet was formed therefrom with an extruder. This sheet was stretched at a rate of two times longitudinally at 160° C. to form a film-shaped composition.

Tablet-Formed Composition

The above granular composition and 1 g of CaO were mixed, and the resultant mixture was formed into tablets having a diameter of 25 mm and a thickness of 10 mm under a load of 100 kg with a tablet-forming machine.

The parcels prepared above were allowed to stand under atmosphere having a temperature of 25° C. and a relative humidity of 80% for 3 hours or 6 hours, and then the adhesive sheet were peeled off. The parcels were measured for a dust number, water absorption performance and an oxygen absorption rate. Tables 5 and 6 show the results.

In addition, the methods for measurement of the dust number, water absorption performance and oxygen absorption rate are as follows.

Dust Number

One 10×10 cm$^2$ gas-permeable packing material was beaten in cleaned pure air flowing at a rate of 3 lit./min., and the number of dust having a size of not less than 0.3 μm was counted with a counter (model 208L supplied by Met. One. Co.). The number obtained was taken as a number of dust adhering to a packing material.)

Water Absorption Performance

Nitrogen was substituted in a glass bottle enclosing 50 ml of saturated salt water, and one parcel was enclosed, and the bottle was sealed and stored for 24 hours at 25° C. An increment which was a difference in weight between the parcel before the storage and the parcel after the storage was taken as a water absorption amount.

Oxygen Absorption Rate

One parcel was enclosed in a 15×20 cm bag formed of a vinylidene chloride-coated stretched nylon/polyethylene composite film together with 250 ml of air, and the bag was sealed stored at 25° C. On the basis of a change of oxygen concentration in the bag with time, a time required to attain an oxygen concentration of 0.1% was obtained, and the time obtained was taken as an oxygen absorption rate.

Comparative Example 6

The same oxygen absorbent parcels as that in Example 13 were prepared in the same manner as in Example 13 excluding that the adhesive-sheet is not attached. The oxygen absorbent parcels were allowed to stand under atmosphere having a temperature of 25° C. and a relative humidity of 80% for 3 hours or 6 hours, and measured for a dust number, water absorption performance and an oxygen absorption rate. Tables 5 and 6 shows the results obtained in this Examples as well as the results obtained in Example 13.

TABLE 5

| | (Packing material A) | | | | | | |
|---|---|---|---|---|---|---|---|
| Standing time under atmosphere | Time to attain oxygen concentration of 0.1% (h) | | | Water absorption amount (mg) | | | Number of dust having a size of not less than |
| (h) | 0 | 3 | 6 | 0 | 3 | 6 | 3 μm |
| Example 13 | | | | | | | |
| Granules-1 | 23 | 22 | 24 | 320 | 310 | 320 | 150 |
| Granules-2 | 18 | 18 | 19 | 410 | 400 | 410 | 200 |
| Sheet | 29 | 32 | 30 | 250 | 260 | 260 | 20 |
| Film | ∞ | ∞ | ∞ | 160 | 160 | 150 | 20 |
| Tablet | 35 | 34 | 34 | 190 | 190 | 180 | 20 |

TABLE 5-continued

| | (Packing material A) | | | | | | |
|---|---|---|---|---|---|---|---|
| Standing time under atmosphere (h) | Time to attain oxygen concentration of 0.1% (h) | | | Water absorption amount (mg) | | | Number of dust having a size of not less than 3 μm |
| | 0 | 3 | 6 | 0 | 3 | 6 | |
| Comparative Example 6 | | | | | | | |
| Granules-1 | 22 | 25 | 65 | 320 | 270 | 220 | 15,000 |
| Granules-2 | 17 | 19 | 34 | 400 | 380 | 300 | 14,000 |
| Sheet | 29 | 32 | 97 | 250 | 210 | 160 | 8,000 |
| Film | ∞ | ∞ | ∞ | 150 | 120 | 100 | 5,000 |
| Tablet | 33 | 38 | 55 | 200 | 170 | 140 | 10,000 |

TABLE 6

| | (Packing material B) | | | | | | |
|---|---|---|---|---|---|---|---|
| Standing time under atmosphere (h) | Time to attain oxygen concentration of 0.1% (h) | | | Water absorption amount (mg) | | | Number of dust having a size of not less than 3 μm |
| | 0 | 3 | 6 | 0 | 3 | 6 | |
| Example 13 | | | | | | | |
| Granules-1 | 21 | 22 | 22 | 410 | 410 | 420 | 50 |
| Granules-2 | 16 | 17 | 17 | 500 | 490 | 500 | 70 |
| Sheet | 26 | 28 | 25 | 350 | 360 | 360 | 17 |
| Film | ∞ | ∞ | ∞ | 260 | 260 | 250 | 18 |
| Tablet | 35 | 34 | 34 | 190 | 190 | 180 | 18 |
| Compartive Example 6 | | | | | | | |
| Granules-1 | 22 | 24 | 55 | 400 | 370 | 320 | 10,000 |
| Granules-2 | 16 | 19 | 33 | 450 | 430 | 400 | 11,000 |
| Sheet | 27 | 23 | 79 | 350 | 310 | 260 | 6,000 |
| Film | ∞ | ∞ | ∞ | 250 | 260 | 280 | 4,000 |
| Tablet | 33 | 38 | 56 | 200 | 160 | 130 | 10,000 |

Example 14 Preparation of Gas-Permeable Packing Material (1)

A porous polyethylene (B-type, supplied by Shin-Nippon Aruku Co., Ltd.) was pressed on a pure white roll paper sheet (basis weight 50 g/m$^2$) under a pressure of 5 kg/cm$^2$ and the paper sheet and the porous polyethylene were laminated on each other by passing them between a paper-side hot roll (temperature 200° C.) and a porous polyethylene-side roll (temperature 100° C.).

Example 15 Preparation of Gas-Permeable Packing Material (2)

100 Parts of a silicone resin monomer (SD7328, toluene solution having a resin content of 30%, supplied by Toray Silicone) was dissolved in 500 parts of toluene together with 0.6 part of a catalyst (SRX212, supplied by Toray Silicone), and the resultant solution was coated on wood free paper (basis weight 50 g/m$^2$) at a rate of 20 g/m$^2$. The silicone resin was polymerized at 140° C. for 1 minute.

A porous polyethylene (B-type, supplied by Shin-Nippon Aruku Co., Ltd.) was laminated on that surface of the wood free paper which was opposite to the resin-coated surface. An adhesive sheet formed by coating 13 g/m$^2$ of butyl polyacrylate on a PET film (thickness 12 μm) was attached to the silicone resin-coated surface to form a packing material. The adhesive sheet attached to the packing material was peeled off, and then, the packing material was measured for an oxygen permeation rate, humidity permeability and a dust number. Table 7 shows the result.

TABLE 7

| | Physical property value |
|---|---|
| Oxygen permeation rate | 42 × 10$^4$ ml/m$^2$.Atm.Day |
| Humidity permeability | 50 g/m$^2$.Day |
| Dust number | 4500/10 × 10 cm$^2$ |

The methods for measurement of the oxygen permeation rate, humidity permeability and dust number are as follows.

Oxygen Permeation Rate

ASTM D1434 (50 RH, 23° C.)

Humidity Permeability

ASTM E96-E (90 RH)

Dust Number

The same method as that described in Example 13 was employed.

Example 16 Preparation of Gas-Permeable Packing Material (2)

A porous polyethylene (B-type, supplied by Shin-Nippon Aruku Co., Ltd.) was laminated on a microporous film (GTAFL9504, 0.3 μm dust capturing efficiency of 67%, supplied by Japan Gore-Tex Co., Ltd.). An adhesive sheet formed by coating 13 g/m$^2$ of butyl polyacrylate on a PET film (thickness 12 μm) was attached to the microporous film surface of the resultant laminate to form a packing material. The adhesive sheet was peeled off, and then, the packing material was measured for an oxygen permeation rate, humidity permeability and dust number. Table 8 shows the results.

TABLE 8

| | Physical property value |
|---|---|
| Oxygen permeation rate | 25 × 10$^5$ ml/m$^2$.Atm.Day |
| Humidity permeability | 150 g/m$^2$.Day |
| Dust number | 4300/10 × 10 cm$^2$ |

Example 17 Preparation of Granular Oxygen Absorbent Composition 0.2 Gram of cobalt naphthenate was dissolved in 1.0 g of soybean fatty acid, and the resultant mixture was impregnated into 5 g of particulate activated carbon. Then, 0.5 g of slaked lime was allowed to cover a surface of the particulate activated carbon to form a granular composition.

Example 18 Preparation of Sheet-Shaped Oxygen Absorbent Composition 0.3 Gram of cobalt salt of tall oil fatty acid was added to a mixture of 0.5 g of a butadiene polymer with 0.5 g of tall oil fatty acid. The mixture was impregnated into a 5×5 cm kraft pulp sheet having a basis weight of 100 g/m$^2$ to form a sheet (I). Further, a mixture liquid of 0.7 g of glycerin (for use in dynamite) with 0.1 g of triethanolamine was impregnated into 5×5 cm kraft pulp sheet having a basis weight of 100 g/m$^2$ to form a sheet (II).

Example 19 Preparation of a Parcel of Granular Oxygen Absorbent Composition

The gas-permeable packing material (1) prepared in Example 14 in a size of 140×70 mm was doubled over on itself with the porous polyethylene surface inside, 2.5 g of the oxygen absorbent composition and 2.5 g of granular calcium oxide were enclosed therebetween, and the above-mentioned doubled packing material was heat-sealed on sides to form a 70×70 mm parcel (to be referred to as "single-packed parcel" hereinafter).

Example 20 Preparation of Sheet-Shaped Oxygen Absorbent Absorbent Parcel

The gas-permeable packing material (1) prepared in Example 14, in a size of 140×70 mm, was doubled over on itself with the porous polyethylene surface inside, the oxygen absorbent sheets (I) and (II) prepared in Example 18 were enclosed therebetween, and the above-mentioned doubled packing material was heat-sealed on sides to form a 70×70 mm parcel (to be referred to as "single-packed parcel" hereinafter).

Example 21 Preparation of Double-Packed Parcel

The packing materials prepared in Examples 15 and 16, in a size of 80×160 mm, were passed on a butyl polyacrylate-coated adhesive roll to remove dust and doubled over on themselves with the porous polyethylene surface inside. Under atmosphere into which air having a dust number of not more than 5,000 per cubic feet was introduced, the parcel prepared in Example 19 or 20 was enclosed in each of the above packing materials and the above packing materials were heat-sealed to form double-packed parcels.

Example 22 Application to Sputtering Target

The adhesive sheet was peeled off from the double-packed parcel prepared in Example 21, and then, the double-packed parcel and a sputtering target (diameter 300 mm) composed of evaporating aluminum, which was an IC wiring element to be fitted into a semiconductor device, were enclosed in a vinylidene chloride 2 μm/stretched nylon 15 μm/polyethylene 50 μm bag (500×500 mm). The bag was sealed and stored at 25° C. at RH of 60% for 3 months not to show that discoloration caused by rust formation of a copper plate fixing the evaporating aluminum of the sputtering target was used to produce IC, it was free from any contamination of IC by dust and usable under a good condition.

Comparative Example 7

Example 22 was repeated except that the double-packed parcel obtained in Example 21 and used in Example 22 was replaced with the parcel obtained in Example 19 or 20. When IC was produced, contamination of the interior of a deposition chamber by dust was extreme, and it took more than 12 hours to remove dust by argon gas substitution, which caused a large loss on the IC production.

Comparative Example 8

Example 22 was repeated except that the double-packed parcel obtained in Example 21 and used in Example 22 was replaced with a double-packed parcel formed by packing the single-packed parcel prepared in Example 19 or 20 with a PET 12 μm/PE 30 μm film having openings (average opening diameter 2 mm, opening ratio 15%)/pure white paper (50 g/m²)/PE 50 μm film having openings (average opening diameter 2 mm, opening ratio 15%) laminated gas-permeable packing material in the same manner as in Example 21. When IC was produced, contamination of the interior of a deposition chamber by dust was extreme, and it took more than 10 hours to remove dust by argon gas substitution, which caused a large loss on the IC production.

Example 23 Dust Number

One each of the parcels prepared in Example 21 and Comparative Example 7 and 8 was beaten in cleaned pure air flowing at a rate of 3 lit./min., and the number of dust having a size of not less than 0.3 μm was counted with a counter (model 208L, supplied by Met One Co.). The number obtained was taken as a number of dust adhering to a surface of each parcel. Table 9 shows the results.

TABLE 9

| Rust-preventive composition | Gas-permeable packing material (2) | | Dist number |
|---|---|---|---|
| Example 21 | | | |
| Granules | Material prepared in Example 15 | Double-packed parcel | 2000 |
| Sheet | Material prepared in Example 15 | Double-packed parcel | 1900 |
| Granules | Material prepared in Example 16 | Double-packed parcel | 2500 |
| Sheet | MBterial prepared in Example 16 | Double-packed parcel | 2300 |
| Comparative Example 7 | | | |
| Granules | None | Single-packed parcel | 90000 |
| Sheet | None | Single-packed parcel | 73000 |
| Comparative Example 8 | | | |
| Granules | Note) | Double-packed parcel | 70000 |
| Sheet | Note) | Double-packed parcel | 68000 |

Note) Laminated gas-permeable packing material explained in comparative Example 8

EXAMPLE 24

Photographs of photographic color charts (foundational juridical person, Nippon Sikisai Kenkyusho) were taken on a commercially available film with a camera model F-3 supplied by Nikon. Exposure was suitably determined with an integrated exposure meter. Then, the film was subjected to development and fixing according to a developing method designated by the manufacturer of said film, and those of colors having a photographic density, in gray portion, of 1.00±0.03 were selected and preserved under conditions shown in Table 10. Tables 11 and 12 summarize degrees of changes in dyestuffs of the film.

Further, prints (35×38 mm) were prepared from the above film, and prints of colors having a photographic density, in gray portion, of 1.00±0.03 were selected and preserved under conditions shown in Table 12. Table 13 summarizes degrees of changes in dyestuffs of the prints. Dyestuff densitometers used were TD 903 (transmission type) and RD 519 (reflection type), supplied by Macbeth Co.

In addition, in a control section, a film print alone was enclosed in a container and the container was sealed. In a nitrogen-substitution section, the procedure of degassing and nitrogen substitution was carried out twice with a gas-filling machine, a film and a print were enclosed in a container and the container was sealed. In a silica gel section, a film and print were preserved together with 3 g of silica gel enclosed in a small gas-permeable bag. In a section of oxygen absorbent for food, a film and print were preserved together with a commercially available low-water-content oxygen absorbent for food (for an air amount of 50 cc).

The preservation conditions in each section were as shown in Table 10.

TABLE 10

Photograph preservation conditions (applicable to Tables 11 to 13).

| | |
|---|---|
| Outer bag: | (Polyvinylidene chloride-coated (3 μ) stretched nylon (15 μ)/polyethylene (50 μ), Size: 100 × 100 mm |
| Preservation temperature: | Room temperature (25 ± 3° C.) |
| Humidity: | 50–80% RH |
| Illuminance: | 15000–4000 Lux |
| Preservation period: | 2.5 months |

TABLE 11

Results of discoloration test on reversal films

| Examination section | Oxygen concentration after test % | Initial dyestuff density | | | Dyestuff density after preservation | | | Decrement | | |
|---|---|---|---|---|---|---|---|---|---|---|
| | | R | G | B | R | G | B | ΔR | ΔG | ΔB |
| Control section | 20.5 | 0.97 | 1.02 | 1.00 | 0.92 | 0.35 | 0.82 | 0.05 | 0.67 | 0.18 |
| Nitrogen-substitution section | 5.3 | 1.02 | 1.00 | 0.99 | 0.90 | 0.40 | 0.81 | 0.12 | 0.60 | 0.18 |
| Silicagel section | 20.5 | 1.00 | 1.01 | 1.01 | 0.93 | 0.32 | 0.85 | 0.07 | 0.69 | 0.16 |
| Food-use oxygen absorbent section | 0.002 | 1.01 | 1.00 | 1.02 | 0.97 | 0.97 | 0.96 | 0.04 | 0.03 | 0.06 |
| Humidity adjusting and oxygen absorbent-1 section | 0.003 | 1.02 | 0.99 | 0.98 | 0.97 | 0.98 | 0.96 | 0.05 | 0.01 | 0.02 |
| Humidity adjusting and oxygen absorbent-2 section | 0.001 | 1.02 | 0.98 | 0.99 | 1.00 | 0.97 | 0.97 | 0.02 | 0.01 | 0.02 |
| Humidity adjusting and oxygen absorbent-3 section | 0.001 | 1.01 | 0.98 | 0.99 | 1.00 | 0.98 | 0.98 | 0.01 | 0.01 | 0.01 |

TABLE 12

Results of discoloration test on color negative films

| Examination section | Oxygen concentration after test % | Initial dyestuff density | | | Dyestuff density after preservation | | | Decrement | | |
|---|---|---|---|---|---|---|---|---|---|---|
| | | R | G | B | R | G | B | ΔR | ΔG | ΔB |
| Control section | 20.5 | 0.97 | 1.00 | 1.03 | 0.93 | 0.22 | 0.75 | 0.08 | 0.78 | 0.28 |
| Nitrogen-substitution section | 8.2 | 1.02 | 1.01 | 0.97 | 0.97 | 0.25 | 0.73 | 0.05 | 0.76 | 0.24 |
| Silicagel section | 20.5 | 0.98 | 1.02 | 1.00 | 0.90 | 0.22 | 0.75 | 0.08 | 0.80 | 0.25 |
| Food-use oxygen absorbent section | 0.002 | 1.00 | 0.98 | 1.01 | 0.97 | 0.97 | 0.92 | 0.03 | 0.01 | 0.09 |
| Humidity adjusting and oxygen absorbent-1 section | 0.001 | 1.02 | 1.02 | 1.03 | 0.98 | 0.98 | 0.96 | 0.04 | 0.04 | 0.07 |
| Humidity adjusting and oxygen absorbent-2 section | 0.001 | 1.02 | 1.03 | 1.02 | 0.98 | 0.99 | 0.97 | 0.04 | 0.04 | 0.05 |
| Humidity adjusting and oxygen absorbent-3 section | 0.001 | 1.01 | 1.01 | 1.03 | 0.99 | 0.98 | 0.98 | 0.02 | 0.03 | 0.05 |

TABLE 13

Results of discoloration test on color prints

| Examination section | Oxygen concentration after test % | Initial dyestuff density | | | Dyestuff density after preservation | | | Decrement | | |
|---|---|---|---|---|---|---|---|---|---|---|
| | | R | G | B | R | G | B | ΔR | ΔG | ΔB |
| Control section | 20.5 | 1.02 | 1.00 | 1.01 | 0.93 | 0.73 | 0.85 | 0.09 | 0.27 | 0.16 |
| Nitrogen-substitution section | 6.2 | 1.02 | 1.02 | 0.99 | 0.97 | 0.80 | 0.80 | 0.05 | 0.22 | 0.19 |
| Silicagel section | 20.5 | 1.00 | 1.02 | 1.00 | 0.90 | 0.77 | 0.82 | 0.10 | 0.25 | 0.18 |
| Food-use oxygen absorbent section | 0.002 | 1.00 | 0.99 | 0.98 | 0.97 | 0.97 | 0.94 | 0.03 | 0.02 | 0.04 |
| Humidity adjusting and oxygen absorbent-1 section | 0.002 | 1.01 | 1.00 | 1.02 | 0.98 | 0.98 | 0.98 | 0.03 | 0.02 | 0.04 |
| Humidity adjusting and oxygen absorbent-2 section | 0.001 | 1.02 | 1.01 | 1.00 | 0.99 | 0.98 | 0.97 | 0.03 | 0.03 | 0.03 |

TABLE 13-continued

| | Results of discoloration test on color prints | | | | | | | | | |
|---|---|---|---|---|---|---|---|---|---|---|
| Examination section | Oxygen concentration after test % | Initial dyestuff density | | | Dyestuff density after preservation | | | Decrement | | |
| | | R | G | B | R | G | B | ΔR | ΔG | ΔB |
| Humidity adjusting and oxygen absorbent-3 section | 0.001 | 0.01 | 1.00 | 1.01 | 0.98 | 0.97 | 0.99 | 0.03 | 0.03 | 0.02 |

Table 11 to 13 show that the control section (under atmosphere), and use of a desiccant and substitution of inert gas such as nitrogen gas, etc., which have been considered to be a method for preservation, are not suitable for preservation of photographs since these methods fail to maintain photographic density under light irradiation. The oxygen absorbent for food and the humidity adjusting and oxygen absorbent (the present invention) has a remarkable effect on prevention of photographic density under light irradiation. Being easy to handle for the preservation, the method using the oxygen absorbent?-? humidity adjusting and oxygen absorbent can be said to be excellent preservation method.

EXAMPLE 25

A test on preservation of films and prints prepared under the same photographic conditions as those in Example 24 was carried out.

These films (35×38 mm) were preserved under conditions as shown in Table 14, and a change in density of each of dyestuffs in a gray portion was measured. Table 15 summarizes the results. And, a physical change of each film was also observed.

In addition, in each of the control section, silica gel section and food-use oxygen absorbent section, the films were preserved in the same manner as that described in Example 24. In the silica gel+food-use oxygen absorbent section, a combination of 3 g of the above silica gel with a food-use oxygen absorbent (for air amount of 50 cc) was enclosed in container and the container was sealed, and then, the photographs were preserved under the conditions as shown in Table 14.

TABLE 14

| Other bag: | Polypropylene (10μ)/polyester (15μ)/thin aluminum film (15μ)/ polyethylene (50μ) Size 100 × 100 mm |
|---|---|
| Preservation temperature: | 80° C. |
| humidity: | 80% RH (humidity set at acceleration tester) |
| Preservation period: | 3,000 h (dark place) |

B) In the food-use oxygen absorbent and silica gel section, oxygen in the system was not completely removed, and as a result, a change in dyestuff density was found.

C) In the food-use oxygen absorbent section, sticking nature arose in the film as a whole, and the photographs were partly fused.

The results in Table 15 show that the method of this invention has a remarkable effect on both maintenance of photographic density and physical maintenance of a photograph base in preservation of photographs in a dark place as compared with a conventional method using a desiccant, an oxygen absorbent or a combination of a desiccant with an oxygen absorbent.

Photographs are often preserved in a dark place. Therefore, this invention provides an effective, simple and less expensive method for preserving photographs for a long period of time.

In addition, the humidity adjusting and oxygen absorbents used in Examples 24 and 25 were prepared as follows.

90 Grams of soybean oil was added to 230 g of a 10% sodium hydroxide aqueous solution together with 400 ml of water for saponification, whereby an aqueous solution of a sodium salt of soybean oil fatty acid was obtained. Added to this solution was 270 g of a 10% aqueous solution of ferric chloride to separate a water layer, whereby 90 g of an iron salt of soybean oil fatty acid was obtained.

180 Grams of quick lime was added to the iron salt of soybean oil fatty acid, and the resultant mixture was fully agitated and solidified. The solid obtained was pulverized with a cutter mixer to obtain an oxygen absorbent.

Further, 2 g of the humidity adjusting agent was prepared by fully mixing 8 g of water with 92 g of glycerin and impregnating the resultant mixture into 300 g of silica gel. The theoretical value of the equilibrium relative humidity of this humidity adjusting agent was 30%, and that was actually found to be 33%.

The humidity adjusting and oxygen absorbent-1 was prepared by enclosing 1 g of the above oxygen absorbent and 2 g of the above humidity adjusting agent in a small gas-permeable bag.

TABLE 15

| | Results of discoloration test on color reversal films in dark place | | | | | | | | | | |
|---|---|---|---|---|---|---|---|---|---|---|---|
| Examination section | Oxygen concentration after test % | Initial dyestuff density | | | Dyestuff density after preservation | | | Decrement | | | |
| | | R | G | B | R | G | B | ΔR | ΔG | ΔB | |
| Control section | 20.5 | 1.02 | 1.00 | 1.01 | 0.95 | 0.90 | 0.91 | 0.07 | 0.10 | 0.10 | |
| Silicagel section | 20.5 | 1.02 | 1.02 | 0.99 | 0.97 | 0.90 | 0.90 | 0.05 | 0.12 | 0.09 | A) |
| Food-use oxygen absorbent and silicagel section | 0.53 | 0.99 | 0.98 | 1.01 | 0.92 | 0.93 | 0.95 | 0.07 | 0.05 | 0.06 | B) |
| Food-use oxygen absorbent section | 0.003 | 1.00 | 0.99 | 0.98 | 0.98 | 0.99 | 0.99 | 0.02 | 0.00 | −0.01 | C) |
| Humidity adjusting and oxygen absorbent section | 0.002 | 1.01 | 1.00 | 1.02 | 1.00 | 1.00 | 1.02 | 0.01 | 0.00 | 0.00 | |

A) In the silica gel section, a intense curl occurred, and microscopic observation showed fine cracks.

1 Gram of the oxygen absorbent composition prepared in Examples 1 and 3 and 2 g of the humidity adjusting agent was enclosed in a small gas-permeable bag to obtain humidity adjusting and oxygen absorbents-2 and -3.

EXAMPLE 26

1 Gram of an iron salt of soybean oil fatty acid, 0.2 g of slaked lime and 1.5 g of powdered activated carbon were mixed with a cutter mixer and allowed to stand still at 25° C. for 10 minutes to form a mass. The mass was pulverized to obtain a granular composition. 2.7 Grams of this composition and 2.5 g of silica gel were separately weighed out, and charged into a small bag of gas-permeable packing material (paper/porous polyethylene) (size: 5×7.5 cm). The small bag was heat-sealed on sides to obtain an oxygen absorbent parcel-1. 2.5 Grams of the composition that was prepared in Examples 1 and 3 and 2.5 g of quick lime were charged into small bag of gas permeable packing material (size: 6×7 cm). The small bags were heat-sealed on sides to obtain oxygen absorbent particles-2 and -3. These oxygen absorbent parcels were enclosed, together with 250 ml of air containing various gases, in a polyvinylidene chloride-coated stretched nylon/polyethylene (KON/PE) bag (size 15×24 cm). This bag was sealed and stored under atmosphere having a temperature of 35° C. and a relative humidity of 80%, and measured for a change of each of gas in concentration with time. Table 16 shows the results.

Comparative Example 9

A desicant parcel was prepared by packing 2.5 g of silica gel with the same material as that in Example 26 in the same manner as in Example 26. With this desiccant parcel in place of the oxygen absorbent parcel, a change of each of gas concentrations with time was measured in the same manner as in Example 26. Table 16 shows the results.

TABLE 16

| Contained gas | Beginning | 1st day | 14th day | 30th day |
| --- | --- | --- | --- | --- |
| Example 26 | | | | |
| Oxygen | 20.6% | 0.1% or less | 0.1% or less | 0.1% or less |
| Carbonic acid gas | 0.52% | 0.1% or less | 0.1% or less | 0.1% or less |
| Acetic acid | 195 ppm | 1 ppm or less | 1 ppm or less | 1 ppm or less |
| Hydrogen sulfide | 210 ppm | 1 ppm or less | 1 ppm or less | 1 ppm or less |
| Methyl chloride | 225 ppm | 1 ppm or less | 1 ppm or less | 1 ppm or less |
| Butylamine | 189 ppm | 1 ppm or less | 1 ppm or less | 1 ppm or less |
| Comparative Example 9 | | | | |
| Oxygen | 20.6% | 20.6% | 20.6% | 20.6% |
| Carbonic acid gas | 0.82% | 0.81% | 0.1% or less | 0.1% or less |
| Acetic acid | 207 ppm | 5 ppm | 1 ppm or less | 1 ppm or less |
| Hydrogen sulfide | 197 ppm | 3 ppm | 1 ppm or less | 1 ppm or less |
| Methyl chloride | 215 ppm | 129 ppm | 3 ppm | 2 ppm |
| Butylamine | 207 ppm | 104 ppm | 7 ppm | 6 ppm |

EXAMPLE 27

A bearing (material: SVJ-2) coated with a rust-preventive oil (NP-9) was degreased by washing it twice with each of toluene, ethanol and Freon 113 and drying it, whereby a bearing as-manufactured was obtained.

The three bearings were individually enclosed in each bag (size: 170×300 mm, oxygen permeation rate of 4 ml/m²·atm·day, humidity permeation rate of 0.2 g/m²·day) of KON/PE together with the oxygen absorbent parcel-1, -2 and -3 prepared in Example 26, and the each bag was sealed.

The sealed bag enclosing this bearing was stored under atmosphere having a temperature of 25° C. and a relative humidity of 50% for 1 day, and the oxygen concentration inside the bag was checked and found to be not more than 0.01%. Thereafter, the bag was stored under atmosphere having a temperature of 35° C. and a relative humidity of 95%, and the surface of the bearing so preserved and a change of each oxygen concentration in inner system with time was observed. Table 17 and Table 18 show the results.

Comparative Example 10

With the desiccant parcel prepared in Comparative Example 9 in place of the oxygen absorbent parcel prepared in Example 27, a bearing treated in the same manner as in Example 27 was enclosed in the same manner as in Example 27. A bag enclosing the bearing was sealed and stored in the same manner as in Example 27, and the surface of the bearing preserved and a change of each oxygen concentration in inner system with time was observed. Table 17 and Table 18 show the results.

Comparative Example 11

The same bearing as that used in Example 27 was enclosed in the same manner as in Comparative Example 10 except that nitrogen gas was substituted for air in a KON/PE bag until the oxygen concentration became 0.7% when the bag was sealed. The bag was sealed and stored in the same manner as in Comparative Example 10, and the surface of the bearing preserved and a change of each oxygen concentration in inner system with time was observed. Table 17 and Table 18 show the results.

TABLE 17

| State of discoloration on bearing surface | | | | | | |
| --- | --- | --- | --- | --- | --- | --- |
| | 1st day | 12th day | 22th day | 30th day | 60nd day | 90th day |
| Example-27 | | | | | | |
| Parcel-1 | AA | AA | AA | A | A | B |
| Parcel-2 | AA | AA | AA | AA | A | A |
| Parcel-3 | AA | AA | AA | AA | AA | AA |
| Comparative Example-10 | A | B | C | C | C | C |
| Comparative Example 11 | C | D | D | D | D | D |

Note 1. State of discoloration on bearing surface
AA   No discoloration
A    Slightly discolored, slight partly
B    Slightly discolored, more than half of surface area
C    Densely discolored, more than half of surface area
D    Densely discolored, nearly entire surface

TABLE 18

| Change of oxygen concentration in inner system with time | | | | | | |
| --- | --- | --- | --- | --- | --- | --- |
| | 1st day % | 12th day % | 22th day % | 30th day % | 60th day % | 90th day % |
| Example-27 | | | | | | |
| Parcel-1 | 0.01 or less | 0.01 or less | 0.02 | 0.08 | 0.27 | 0.88 |

TABLE 18-continued

Change of oxygen concentration in inner system with time

| | 1st day % | 12th day % | 22th day % | 30th day % | 60th day % | 90th day % |
|---|---|---|---|---|---|---|
| Parcel-2 | 0.01 or less | 0.01 or less | 0.01 or less | 0.01 | 0.04 | 0.08 |
| Parcel-3 | 0.01 or less | 0.01 or less | 0.01 or less | 0.01 or less | 0.01 or less | 0.01 or lass |
| Comparative Example-10 | 20.73 | 20.71 | 20.69 | 20.51 | 20.32 | 20.29 |
| Comparative Example-11 | 0.71 | 2.53 | 4.46 | 6.98 | 11.21 | 17.95 |

EXAMPLES 28-33

One kilograms or 0.2 kg of one of various powders being oxidized was enclosed individually in each inner bag (size 150×330 mm) of a 40μ polyethylene film together with the oxygen absorbent parcels-1, -2 and -3 prepared in Example 26, and rubber-banded to close them. The inner bags were then put into each outer bag (size 170×300 mm) of KON/PE, and the outer bags were heat-sealed to close them. These sealed double-packed bag enclosing the oxidizing powder was stored under a temperature of 25° C. and a relative humidity of 50% for 1 day, and the oxygen concentration inside the bags were checked and found to be not more than 0.01%. Therefore, the bags were stored under a temperature of 35° C. and a relative humidity of 95% for 3 months, and a hydrogen reduction loss of the oxidizing powder and an oxygen concentration inside the bags were measured. Table 19 shows the results.

Comparative Example 12

A copper powder was enclosed in the same manner as in Example 28 except that the desiccant parcel prepared in Comparative Example 9 was used in place of the parcel prepared in Example 26. The resultant double-packed bag was sealed and stored in the same manner as in Example 28, and a hydrogen reduction loss of the copper powder and an oxygen concentration inside the bag was measured in the same manner as in Example 28. Table 19 shows the results.

Comparative Example 13

A copper powder was enclosed in the same manner as in Comparative Example 12 except that nitrogen gas was substituted in the bag for air until the oxygen concentration became 0.7% when the KON/PE bag was sealed. The resultant double-packed bag was sealed and stored in the same manner as in Comparative Example 12, and a hydrogen reduction loss of the copper powder and an oxygen concentration inside the bag were measured in the same manner as in Example 28. Table 19 shows the results.

Comparative Example 14

A powder being oxidized was preserved in the same manner as in Example 28 except that the parcel prepared in Example 26 was not used. A hydrogen reduction loss of the powder being oxidized and an oxygen concentration inside the bag were measured in the same manner as in Example 28. Table 19 shows the results.

Table 19

| | Powder being oxidized | | | | Oxygen concentration inside bag % | Hydrogen rediction loss % Note 3) | |
|---|---|---|---|---|---|---|---|
| No. | Kind | Grain size μ | Oxygen absorption rate Note 1) | Parcel | After preservation | Before preservation | After preservation |
| Example | | | | | | | |
| 28 | Copper powder | 1 | 2.45 | 1 | 0.01 or less | 0.4 | 0.5 |
| 29 | Copper powder | 145 | 0.07 | 2 | 0.01 or less | 0.2 | 0.3 |
| 30 | Iron powder | 250 | 0.03 | 3 | 0.01 or less | 0.0 | 0.0 |
| 31 | Iron powder | 470 | 0.02 | 3 | 0.01 or less | 0.0 | 0.1 |
| 32 | Silver powder | 240 | 0.04 | 2 | 0.01 or less | 0.1 | 0.2 |
| 33 | Carbon powder Note 4) | 2 | 0.01 | 3 | 0.01 or less | 0.0 | 0.0 |
| Comparative Example | | | | | | | |
| 12 | Copper powder | 1 | 2.4 | | 11.53 | 0.4 | 1.4 |
| 13 | Copper powder | 1 | 2.4 | | 0.01 or less | 0.4 | 1.1 |
| 14 | Copper powder | 1 | 2.4 | | 2.54 | 0.4 | 3.8 |

Note 1): ml/g · month
Note 2): Method for measurement of oxygen absorption rate for powder being oxidized 50 Grams of a powder was enclosed in an aluminum foil composite film bag (200 × 300 mm) together with 200 ml of air, and the bag was sealed and stored at 25° C. for 1 month. Thereafter, an oxygen concentration within the bag was analyzed and an oxygen absorption rate was determined on the basis of the following equation. (20.6 - oxygen concentration after storage) × (0.01) × (200) ÷ 50 = oxygen absorption amount after 1 month [ml/g · month]
Note 3): Hydrogen reduction loss 5 Grams of a sample was allowed to stand under hydrogen atmosphere (1,000° C.) for 4 hours, and a decrement in weight was taken as a hydrogen reduction loss. This decrement in weight was mainly caused by oxygen.
Note 4): The weight was 0.2 kg. The weights of the other powders were 1 kg.

EXAMPLE 34-39

Zinc stearate was added to each of the powders being oxidized rate of 0.7% preserved in Examples 28 to 33, and then, 10 g of each mixture was put into a molding vessel having a diameter of 5 mm and press-shaped under a load of 5 t. The resultant shaped tablets were sintered with a nitrogen/hydrogen mixture gas having a nitrogen/hydrogen mixing ratio of ⅓ by heating them, for 30 minutes, to 1,000° C. when the shaped tablets were formed of a copper or silver powder, to 1,150° C. when the shaped tablets were formed of an iron powder or to 1,200° C. when the shaped tablet was a carbon powder. The resultant sintered tablets were measured for a density (lengthwise) and a tensile strength. Table 20 shows the results.

Comparative Example 15-17

The powder being oxidized preserved in Comparative Examples 12 to 14 were shaped and sintered in the same manner as in Examples 34 to 35, and the resultant sintered tablets were measured for a density (lengthwise) and a tensile strength. Table 20 also shows the results.

TABLE 20

| No. | Oxidizing powder | Sintered density g/cc | Tensile strength kg/mm² |
|---|---|---|---|
| Example | | | |
| 34 | Example-28 | 8.18 | 7 |
| 35 | Example-29 | 8.15 | 6 |
| 36 | Example-30 | 6.92 | 14 |
| 37 | Example-31 | 6.86 | 14 |
| 38 | Example-32 | 7.53 | 6 |
| 39 | Example-33 | 2.15 | 3 |
| Comparative Example | | | |
| 15 | Comparative Example-12 | 7.89 | 4 |
| 16 | Comparative Example-13 | 7.96 | 5 |
| 17 | Comparative Example-14 | 7.63 | 3 |

EXAMPLE 40

A copper alloy thin plate (thickness 1.27×width 62×length 200 mm) was punched out with a press machine and its surface was etched with an aqueous solution containing sulfuric acid and hydrogen peroxide to form a lead frame. Gold was attached to an IC chip-attaching site of the lead frame. Hundred-fifty lead frames in total were prepared in the same manner, and every 50 lead frames were bundled. These three bundles were packed with a polypropylene film, and further packed with a sheet formed of natural pulp (trade name NS-150, water extraction pH 7, water content 3%, basis weight 150 g/m² width 300 mm length 400 mm, supplied by Hokuyo Seishi) to form one package.

The above package was enclosed in a case (width 70×length 200×height 50 mm) formed of polypropylene together with the oxygen absorbent parcel-1, -2 and -3 prepared in Example 26, the cases were packed in a KON/PE bag *size 170×300 mm), and the bags were sealed. These sealed bags packing the lead frames were stored under a temperature of 25° C. and a relative humidity of 50% for one day, and the oxygen concentration inside the bags were checked and found to be not more than 0.01%. Thereafter, the bag was stored for periods of several cycles, each cycle consisting of storage under a temperature of 50° C. and a relative humidity of 95% for 2 days and under a temperature of 0° C. and a relative humidity of 100% for 5 days. The copper alloy surface of each lead frame preserved above was observed. Table 21 shows the results. Table 22 and Table 23 show humidity and oxygen concentration change with time of inside the bag.

EXAMPLE 41

Oxygen absorbent parcels-1, -2 and -3 prepared an Example 26 in the same method as in Example 40 excluding that natural pulp is not used were packed and sealed together with lead frames. They were stored in the same method and conditions as in Example 40. The copper alloy surface of lead frame after preservation was observed. Tables 21, 22 and 23 show the results.

Comparative Example 18

Lead frames were packed in the same manner as in Example 40 except that the desiccant parcel prepared in Comparative Example 9 was used in place of the oxygen absorbent parcel prepared in Example 26. The lead frames so-packed were stored in the same manner as in Example 40 and under the same conditions as those in Example 40, and the copper alloy surface of each lead frame and a humidity and oxygen concentration change with time of inside of the bag was observed. Tables 21, 22 and 23 show the results.

Comparative Example 19

Lead frames were packed and preserved in the same manner as in Comparative Example 18 except that, when the case was enclosed in the bag, nitrogen gas was substituted for air in the bag until the oxygen concentration became 2.7%. The copper alloy surface of each lead frame preserved was observed. Table 21 shows the results.

FIGS. 22 and 23 shows a change in humidity and oxygen concentration in the system with time.

Table 21

| | Parcel | 7th day | 14th day | 30th day | 60th day | 90th day |
|---|---|---|---|---|---|---|
| Example-40 | 1 | — | — | — | — | — |
| | 2 | — | — | — | — | — |
| | 3 | — | — | — | — | — |
| Example-41 | 1 | — | — | — | — | — |
| | | | | | | Note 2) |
| | 2 | — | — | — | — | — |
| | 3 | — | — | — | — | — |
| Comparative Example-18 | — | ++ | ++++ | ++++ | ++++ | |
| Comparative Example-19 | — | ++ | ++++ | ++++ | ++++ | |

Note 1: State of discoloration on alloy surface
—: No discoloration
+: Slightly discolored
++: Slightly discolored, more than half of surface area
+++: Densely discolored, more than half of surface area
++++: Densely discolored, nearly entire surface
Note 2: A trace of dew was observed on the metallic surface, but remarkable discolor was not observed

TABLE 22

| | | Preservation day and humidity in the system, RH % | | | | |
|---|---|---|---|---|---|---|
| | Parcel | 7th day | 14th day | 30th day | 60th day | 90th day |
| Example-40 | 1 | 2 | 7 | 15 | 25 | 46 |
| | 2 | 3 | 6 | 17 | 27 | 47 |
| | 3 | 2 | 7 | 14 | 24 | 44 |
| Example-41 | 1 | 3 | 11 | 21 | 32 | 57 |
| | 2 | 2 | 9 | 17 | 25 | 44 |
| | 3 | 2 | 8 | 15 | 24 | 43 |
| Comparative Example-18 | | 3 | 19 | 42 | 66 | 89 |
| Comparative Example-19 | | 2 | 17 | 41 | 65 | 90 |

TABLE 23

| | | Preservation days and oxygen concentration in the system, % | | | | |
|---|---|---|---|---|---|---|
| | Parcel | 7th day | 14th day | 30th day | 60th day | 90th day |
| Example-40 | 1 | 0.01 or less | 0.01 or less | 0.01 or less | 0.01 or less | 0.01 or less |
| | 2 | 0.01 or less | 0.01 or less | 0.01 or less | 0.01 or less | 0.01 or less |
| | 3 | 0.01 or less | 0.01 or less | 0.01 or less | 0.01 or less | 0.01 or less |
| Example-41 | 1 | 0.01 or less | 0.01 or less | 0.01 or less | 0.01 or less | 0.01 or less |
| | 2 | 0.01 or less | 0.01 or less | 0.01 or less | 0.01 or less | 0.01 or less |
| | 3 | 0.01 or less | 0.01 or less | 0.01 or less | 0.01 or less | 0.01 or less |
| Comparative Example-18 | | 20.6 | 20.6 | 20.5 | 20.5 | 20.4 |
| Comparative | | 2.9 | 3.5 | 4.3 | 5.8 | 7.5 |

TABLE 23-continued

| | Preservation days and oxygen concentration in the system, % | | | | |
|---|---|---|---|---|---|
| Parcel | 7th day | 14th day | 30th day | 60th day | 90th day |
| Example-19 | | | | | |

EXAMPLES 42

A copper alloy thin plate (thickness 1.27×width 62×length 200 mm) was punched out with a press machine and its surface was etched with an aqueous solution containing sulfuric acid and hydrogen peroxide to form a lead frame. Gold was attached to an IC chip-attaching site of the lead frame. Hundred-fifty lead frames in total were prepared in the same manner, and every 50 lead frames were bundled. The resultant three bundles were packed with a polypropylene film, and further packed with a sheet formed of natural pulp (trade name NS-150, water extraction pH 7, water content 3%, basis weight 150 g/m² width 300 mm, length 400 mm supplied by Hokuyo Seishi) to form one package.

The above package was enclosed in a case (width 70×length 200×height 50 mm) formed of polypropylene together with the oxygen absorbent parcel-3 prepared in Example 26, the case was packed in a KON/PE bag (size 170×300 mm), and the bas was sealed. This sealed bag packing the lead frames was stored under atmosphere having a temperature of 30° C. and a relative humidity of 50% for 1 day, and the oxygen concentration inside the bag was checked and found to be not more than 0.01%. Thereafter, the bag was transported from Singapore to Japan by a vessel by taking 1 month. The copper alloy surface of each of the lead frames transported was observed to show that the lead frames were under a good preservation conditions without any discoloration which was to be caused by dew formation and rust on the surface.

Comparative Example 20

Lead frames were enclosed in the same manner as in Example 41 except that the desiccant parcel prepared in Comparative Example 9 was used in place of the oxygen absorbent parcel used in Example 40. The resultant bag was sealed and stored in the same manner as in Example 41, and the copper alloy surface of each lead frame was observed to show that the color on the entire surface was changed to dark blue and some portions of the surface showed dot-like dew formation. Thus, the lead frames were under an unusable condition.

Comparative Example 21

Lead frames were enclosed and preserved in the same manner as in Comparative Example 20 except that, when the case was packed and sealed in a bag, nitrogen gas was substituted for air in the bag until the oxygen concentration became 2.7%. The surface of each lead frame preserved was observed to show that the color on the entire surface was changed to dark blue and some portions of the surface showed dot-like dew formation.

The oxygen absorbent composition of this invention exhibits a higher oxygen absorption rate and a higher maximum oxygen absorption amount than conventional compositions, and remarkably improves the effect on preservation of articles. The parcel formed by packing the oxygen absorbent composition with a gas-permeable packing material, provided by this invention, is suitably usable for the preservation of metals, metal products, electronic products, electronic parts and components, dry food, medicaments, photographs, ancient documents, drawings, pressed flowers, and the like. When the oxygen absorbent composition parcel of this invention is used as a rust preventive in particular, a large effect on rust prevention can be expected.

The composition containing the oxygen absorbent composition and a humidity adjusting agent in combination, provided by this invention, is capable of adjusting the humidity of a preservation system to an optimum one for preservation, free from occurrence of hydrogen and hydrogen sulfide, and capable of removing undesirable substances present in a sealed bag or container in which an article is enclosed, e.g. acidic substances such as sulfur compounds etc., and reducing substances such as formaldehyde, etc., by absorbing them.

In a system in which the parcel formed by packing a combination of the oxygen absorbent composition with a humidity adjusting agent, provided by this invention, with a gas-permeable packing material is enclosed in a sealed container together with an article, property alteration, deterioration and corrosion of the article can be prevented, and a crack due to dryness and rust and swelling due to high humidity can be prevented.

Further, the method of producing the effects of the oxygen absorbent composition of this invention and the parcel thereof is very simple, i.e. all that is necessary therefor is to enclose an article and the oxygen absorbent composition parcel of this invention in a bag or container having gas-barrier properties and seal the bag or container. Thus, no large-scale apparatus or equipment for preservation is required.

The parcel formed by packing a composition containing the oxygen absorbent composition of this invention and a humidity adjusting agent in combination with a gas-permeable packing material is suitably usable for the preservation of ancient manuscripts and documents, photographs, magnetic tapes, specimens, medicaments, etc.

The parcel formed by attaching an adhesive sheet on a surface of the parcel formed by packing the oxygen absorbent composition of this invention with a gas-permeable packing material is free from deterioration in performance since air is shut off before the use of the parcel, and it is easy to handle. Further, the adhesive sheet is peeled off when the parcel is used, whereby dust adhering to the parcel surface is transferred to the adhesive sheet side and removed. The volatilization of gases to be produced at an oxygen absorption time is a little. Therefore, the present parcel is suitably usable for the preservation of semiconductors and semiconductor parts.

The double-packed parcel formed by packing the oxygen absorbent composition of this invention with a gas-permeable packing material and further packing the resultant parcel with another gas-permeable packing material (2) is free from a short circuit and rust in an electric circuit, which are formed due to contamination of an article by dust, since little dust sticks to the parcel surface. Therefore, the present double-packed parcel is the most suitable for the preservation of electronic parts and electronic products, in particular, parts for semiconductors and materials for the production of semiconductors.

The parcel formed by the oxygen absorbent composition with a gas-permeable packing material can be applied to the preservation of a variety of articles.

Differing from conventional oxygen absorbents, the oxygen absorbent composition of this invention continues an oxygen absorption reaction even when the humidity of a photograph preservation system is kept low by means of a humidity adjusting agent, since water is not necessary for the oxygen absorption and the maximum oxygen absorption amount is high. It is therefore made possible to preserve photographs for a longer period of time. In no case are dyestuffs altered by a trace amount of hydrogen or sulfur compounds, and the present composition is hence desirably usable. Using a humidity adjusting agent in combination, the method of preserving a photograph, provided by this invention, exhibits a function of maintaining a constant humidity required for the preservation of a photograph as well as a function of preserving a photograph.

Conventionally available preservation methods such as a method utilizing a low temperature and a low humidity, which is costly and ineffective, and a method using an oxygen absorbent and a desiccant in combination, in which an oxygen absorption reaction is terminated during the preservation, are in complete. Further, a conventional preservation method using an oxygen absorbent sometimes causes critical physical destruction such as fusion of a photograph onto a preserving bag, etc., due to water transfer, although deterioration of an image can be prevented.

The method of preserving a photograph, provided by this invention, overcomes the above defects of conventional techniques, makes it possible to simply and easily preserve a photograph in the absence of oxygen at a constant low humidity, and makes it possible to prevent deterioration and physical degradation of an original image texture simply and at a low cost.

The method for producing the effects of this invention is very simple. That is, all that is necessary is to enclose a photograph and the oxygen absorbent parcel of this invention, a combination of said parcel with a humidity adjusting agent or a substance which has both an oxygen absorbent function and a humidity adjusting function in a suitable packing material and seal it.

In the method of preserving a bearing, the oxygen absorbent parcel of this invention and a bearing are enclosed in a container having gas-barrier properties and the container is sealed, whereby the oxygen absorbent composition of this invention inhibits formation of rust on the bearing by absorbing water and oxygen in the container and further absorbing water, oxygen and acidic gases permeating from atmosphere outside the container.

When the method of preserving a bearing, provided by this invention, is employed, manufacturer can carry out planned production of bearings, transport bearings over the seas or from overseas and simplify the preservation method. Further, users can enjoy merits that they can save a washing labor and decrease an amount of a washing solvent.

The preservation method of this invention is particularly suitable for users engaged in the fields of precision machines, electronic machines and devices, etc., where a rust-preventive oil applied to bearings is disadvantageous.

In these times when there is a warning of environmental pollution, the present preservation method can reduce an amount of a solvent, one of pollution sources, and is valuable if considered from a global point of view.

In the method of preserving a powder being oxidized, the oxygen absorbent parcel of this invention and a powder being oxidized are enclosed in a container having gas-barrier properties and the container is sealed, whereby the oxygen absorbent composition of this invention makes it possible to inhibit oxidation and alteration of the powder being oxidized, improve the strength of a shaped and sintered body and prevent deterioration of magnetic density by absorbing water and oxygen in the container and absorbing and completely eliminating water, oxygen and acidic gases permeating from atmosphere outside the container, which preservation method has not been possible by conventional techniques.

The present preservation method is simple and has merits that a powder being oxidized can be preserved longer, and a manufacturer can provide products stable in quality, carry out planned production instead of production after receipt of an order and ship products abroad by a vessel.

In the method of preserving a metal or a product containing a metal, the metal or the product containing a metal are enclosed in a container having gas-barrier properties together with the oxygen absorbent parcel of this invention and the container is sealed, it is made possible to achieve the preservation that prior techniques could not achieve by preventing dew formation and inhibiting rust formation in spite of a sudden change in preservation conditions (temperature and humidity) during the transportation by air or vessel. Such an improvement in the preservation makes it possible to manufacture a metal and products containing a metal such as a lead frame, a shadow mask, etc., according to a plan and perfectly preserve them without causing rust on the metal even when they are transported from overseas.

What is claimed is:

1. A method of preserving an article, which comprises enclosing the article and an oxygen absorbent parcel in a container having gas-barrier properties and sealing said container, said parcel being formed by packing an oxygen absorbent composition, in an amount sufficient to preserve the article while sealed in the container, with a gas-permeable packing material, the oxygen absorbent composition comprising:

a polymer selected from the group consisting of polymers of isoprene, butadiene, 1,3-pentadiene and squalene, or a mixture of said polymer with an unsaturated fatty acid compound;

0.1 to 75 parts by weight per 100 parts by weight of the polymer or the mixture of the polymer with the unsaturated fatty acid compound, of an oxidation promoter selected from the group consisting of transition metals and transition metal compounds;

0.1 to 1,000 parts by weight, per 100 parts by weight of the polymer or the mixture of the polymer with the unsaturated fatty acid compound, of a basic substance selected from the group consisting of oxides, hydroxides, carbonates, organic acid salts of alkali metals and alkaline earth metals and amine compounds; and 50 to 1,000 parts by weight, per 100 parts by weight of the polymer or the mixture of the polymer with the unsaturated fatty acid compound, of an adsorption substance selected form the group consisting of silica gel, activated clay, diatomaceous earth, zeolite, activated carbon and pearlite.

2. A method of preserving an article according to claim 1, wherein an adhesive layer of an adhesive sheet comprising an adhesive and a sheet is attached to a surface of the oxygen absorbent parcel.

3. A method for preserving an article according to claim 1, wherein the gas-permeable packing material has a humidity permeability of not less than 1 g/m$^2$·day, an oxygen permeation rate of not less than 1,000 ml/m$^2$·atm·day and a dust capturing ratio of not less than 50% for dust having a size of not less than 0.3 μm.

4. A method for preserving an article according to claim 1, wherein a natural pulp is further enclosed in said container, and said article is a metal or a metal containing product.

5. A method of preserving an article according to claim 1, wherein said container has an oxygen permeability, per a volume of 100 ml, of not more than 5 ml/day, and a humidity permeation rate of not more than 5 g/day.

6. A method of preserving an article according to claim 1, wherein said container has an oxygen permeability, per a volume of 100 ml, of not more than 10 ml/day and a humidity permeation rate of not more than 10 g/day.

7. A method of preserving an article according to claim 6, wherein the article is one member selected from the group consisting of metals, metal-containing products, electronic products, electronic parts, dry foods, medicants, photographs, ancient documents, paintings, pressed flowers, and oxidizable powders.

8. A method for preserving an article according to claim 6, wherein said article is one member selected from the group consisting of metals, metal-containing products, electronic products and electronic parts.

9. A method for preserving an article according to claim 6, wherein said article is a bearing.

10. A method for preserving an article according to claim 6, wherein said article is an oxidizable powder.

11. A method of preserving an article, which comprises enclosing the article and an oxygen absorbent parcel in a container having gas-barrier properties and sealing said container, said parcel being formed by packing an oxygen absorbent composition, in an amount sufficient to preserve the article while sealed in the container, with a gas-permeable packing material, the oxygen absorbent composition comprising:

a polymer selected from the group consisting of polymers of isoprene, butadiene, 1,3-pentadiene and squalene, or a mixture of said polymer with an unsaturated fatty acid compound; and 0.1 to 75 parts by weight per 100 parts by weight of the polymer or the mixture of the polymer with the unsaturated fatty acid compound, of an oxidation promoter selected from the group consisting of transition metals and transition metal compounds;

0.1 to 10 parts by weight, per 100 parts by weight of the composition, of a humidity adjusting agent having a viscosity, at 20° to 50° C., of not more than 10$^4$ cp and an equilibrium relative humidity of not more than 70%, said humidity adjusting agent providing an equilibrium relative humidity of 20 to 70% in an enclosed system, 0.1 to 1,000 parts by weight, per 100 parts by weight of the polymer or the mixture of the polymer with an unsaturated fatty acid compound, of a basic substance selected from the group consisting of oxides, hydroxides, carbonates, organic acid salts of alkali metals and alkaline earth metals and amine compounds; and 50 to 1,000 parts by weight, per 100 parts by weight of the polymer or the mixture of the polymer with the unsaturated fatty acid compound, of an adsorption substance selected from the group consisting of silica gel, activated clay, diatomaceous earth, zeolite, activated carbon, and pearlite.

12. A method of preserving an article according to claim 11, wherein said container has an oxygen permeability, per a volume of 100 ml, of not more than 5 ml/day, and a humidity permeation rate of not more than 5 g/day.

13. A method of preserving an article according to claim 11, wherein said container has an oxygen permeability, per a volume of 100 ml, of not more than 10 ml/day and a humidity permeation rate of not more than 10 g/day.

14. A method of preserving an article according to claim 13, wherein the article is one member selected from the group consisting of metals, metal-containing products, electronic products, electronic pars, dry foods, medicants, photographs, ancient documents, paintings, pressed flowers, and oxidizable powders.

15. A method for reserving an article according to claim 13, wherein said article is one member selected from the group consisting of metals, metal-containing products, electronic products and electronic parts.

16. A method for preserving an article according to claim 13, wherein said article is a bearing.

17. A method of preserving an article according to claim 13, wherein in said article is an oxidizable powder.

18. A method for preserving an article according to claim 13, wherein aid article is one member selected from the group consisting of medicant, a photograph, a specimen and an ancient document.

19. A method of preserving an article, which comprises enclosing the article, an oxygen absorbent parcel and a humidity adjusting agent in a container having gas-barrier properties and sealing said container, said parcel being formed by packing an oxygen absorbent composition, in an amount sufficient to preserve the article while sealed in the container, with a gas-permeable packing material, the humidity adjusting agent being present in an amount sufficient to maintain an equilibrium relative humidity of not more than 70% while sealed in the container, the oxygen absorbent composition comprising:

a polymer selected from the group consisting of polymers of isoprene, butadiene, 1,3-pentadiene and squalene, or a mixture of said polymer with an unsaturated fatty acid compound;

0.1 to 75 parts by weight per 100 parts by weight of the polymer or the mixture of the polymer with the unsaturated fatty acid compound, of an oxidation promoter selected from the group consisting of transition metals and transition metal compounds;

0.1 to 1,000 parts by weight, per 100 parts by weight of the polymer or the mixture of the polymer with the unsaturated fatty acid compound, of a basic substance selected from the group consisting of oxides, hydroxides, carbonates, organic acid salts of alkali metals and alkaline earth metals and amine compounds; and 50 to 1,000 parts by weight, per 100 parts by weight of the polymer or the mixture of the polymer with the unsaturated fatty acid compound, of an adsorption substance selected form the group consisting of silica gel, activated clay, diatomaceous earth, zeolite, activated carbon and pearlite.

20. A method of preserving an article according to claim 19, wherein said container has an oxygen permeability, per a volume of 100 ml, of not more than 5 ml/day, and a humidity permeation rate of not more than 5 g/day.

21. A method of preserving an article according to claim 19, wherein said container has an oxygen permeability, per a volume of 100 ml, of not more than 10 ml/day and a humidity permeation rate of not more than 10 g/day.

22. A method of preserving an article according to claim 21, wherein the article is one member selected from the group consisting of metals, metal-containing products, electronic products, electronic parts, dry foods, medicants, photographs, ancient documents, paintings, pressed flowers, and oxidizable powders.

23. A method for preserving an article according to claim 21, wherein said article is one member selected from the group consisting of metals, metal-containing products, electronic products and electronic parts.

24. A method for preserving an article according to claim 21, wherein said article is a bearing.

25. A method for preserving an article according to claim 21, wherein said article is an oxidizable powder.

26. A method for preserving an article according to claim 21, wherein said article is one member selected from the group consisting of a medicant, a photograph, a specimen and an ancient document.

27. A method of preserving a powder from being oxidized, which comprises enclosing the powder and an oxygen absorbent parcel in a container having gas-barrier properties and sealing said container, said parcel being formed by packing an oxygen absorbent composition, in an amount sufficient to preserve the powder from being oxidized while sealed in the container, with a gas-permeable packing material, the oxygen absorbent composition comprising:
  a polymer selected from the group consisting of polymers of isoprene, butadiene, 1,3-pentadiene and squalene, or a mixture of said polymer with an unsaturated fatty acid compound;
  0.1 to 75 parts by weight per 100 parts by weight of the polymer or the mixture of the polymer with the unsaturated fatty acid compound, of an oxidation promoter selected from the group consisting of transition metals and transition metal compounds;
  0.1 to 1,000 parts by weight, per 100 parts by weight of the polymer or the mixture of the polymer with the unsaturated fatty acid compound, of a basic substance selected from the group consisting of oxides, hydroxides, carbonates, organic acid salts of alkali metals and alkaline earth metals and amine compounds; and
  50 to 1,000 parts by weight, per 100 parts by weight of the polymer or the mixture of the polymer with the unsaturated fatty acid compound, of an adsorption substance selected form the group consisting of silica gel, activated clay, diatomaceous earth, zeolite, activated carbon and pearlite.

28. A method of preserving an article, which comprises enclosing the article and a double-packed oxygen absorbent parcel in a container having gas-barrier properties and sealing said container, said double-packed parcel being formed by packing an oxygen absorbent composition, in an amount sufficient to preserve the article while sealed in the container, with a gas-permeable packing material to form a single-packed parcel and further packing the single-packed parcel with a gas-permeable packing material having a humidity permeability of not less than 1 g/m$^2$·day an oxygen permeation rate of not less than 1,000 ml/m$^2$·atm·day and a dust capturing ratio of not less than 50% for dust having a size not less than 0.3 μm, the oxygen absorbent composition comprising:
  a polymer selected from the group consisting of polymers of isoprene, butadiene, 1,3-pentadiene and squalene, or a mixture of said polymer with an unsaturated fatty acid compound;
  0.1 to 75 parts by weight per 100 parts by weight of the polymer or the mixture of the polymer with the unsaturated fatty acid compound, of an oxidation promoter selected from the group consisting of transition metals and transition metal compounds;
  0.1 to 1,000 parts by weight, per 100 parts by weight of the polymer or the mixture of the polymer with the unsaturated fatty acid compound, of a basic substance selected from the group consisting of oxides, hydroxides, carbonates, organic acid salts of alkali metals and alkaline earth metals and amine compounds; and
  50 to 1,000 parts by weight, per 100 parts by weight of the polymer or the mixture of the polymer with the unsaturated fatty acid compound, of an adsorption substance selected form the group consisting of silica gel, activated clay, diatomaceous earth, zeolite, activated carbon and pearlite.

* * * * *